United States Patent
Goto et al.

(10) Patent No.: US 10,444,542 B2
(45) Date of Patent: Oct. 15, 2019

(54) DECENTERED TYPE CONTACT LENS AND DECENTERED TYPE CONTACT LENS SET

(71) Applicant: MENICON CO., LTD., Nagoya-shi, Aichi (JP)

(72) Inventors: Yuji Goto, Kasugai (JP); Mitsuhiko Nakada, Nagoya (JP)

(73) Assignee: MENICON CO., LTD., Nagoya (JP)

( * ) Notice: Subject to any disclaimer, the term of this patent is extended or adjusted under 35 U.S.C. 154(b) by 47 days.

(21) Appl. No.: 15/122,587

(22) PCT Filed: Mar. 4, 2014

(86) PCT No.: PCT/JP2014/055514
§ 371 (c)(1),
(2) Date: Aug. 30, 2016

(87) PCT Pub. No.: WO2015/132889
PCT Pub. Date: Sep. 11, 2015

(65) Prior Publication Data
US 2017/0090216 A1    Mar. 30, 2017

(51) Int. Cl.
*G02C 7/04* (2006.01)

(52) U.S. Cl.
CPC .......... *G02C 7/048* (2013.01); *G02C 7/041* (2013.01); *G02C 2202/02* (2013.01); *G02C 2202/04* (2013.01); *G02C 2202/24* (2013.01)

(58) Field of Classification Search
CPC .... G02C 2202/04; G02C 7/048; G02C 7/041; G02C 2202/02; G02C 2202/24
(Continued)

(56) References Cited

U.S. PATENT DOCUMENTS 4,318,595 A * 3/1982 Van der Kolk ........ G02C 7/048
351/159.21
5,422,687 A   6/1995 Tanaka et al.
(Continued)

FOREIGN PATENT DOCUMENTS

EP   0 201 231 A2   11/1986
EP   2 239 617 A1   10/2010
(Continued)

OTHER PUBLICATIONS

Oct. 6, 2017 Extended Search Report issued in European Patent Application No. 14884803.9.
(Continued)

*Primary Examiner* — George G King
(74) *Attorney, Agent, or Firm* — Oliff PLC

(57) ABSTRACT

A decentered type contact lens including: an optical zone provided in a center part of the contact lens; a peripheral zone provided on an outer circumference of the optical zone; an optical center of the optical zone being set to deviate from a lens geometric center; and a circumferential direction alignment mechanism for setting a lens circumferential direction position in a worn state, the contact lens being characterized in that: a center-of-gravity deviation in relation to the lens geometric center is set for the peripheral zone, and a center-of-gravity position shift accompanying deviation of the optical center of the optical zone in relation to the lens geometric center is corrected by offset using the center-of-gravity deviation of the peripheral zone.

20 Claims, 16 Drawing Sheets

(58) Field of Classification Search
USPC .................................................. 351/159.36
See application file for complete search history.

(56) References Cited

U.S. PATENT DOCUMENTS

| | | | | |
|---|---|---|---|---|
| 5,971,542 A * | 10/1999 | Volker | ............... | G02C 7/021 351/159.41 |
| 6,030,077 A * | 2/2000 | Sawano | ............... | A61F 2/1618 351/159.42 |
| 6,109,749 A * | 8/2000 | Bernstein | ............... | G02C 7/043 351/159.41 |
| 2004/0017542 A1 | 1/2004 | Lindacher et al. | | |
| 2006/0244903 A1* | 11/2006 | Ye | ............... | G02C 7/04 351/159.21 |
| 2007/0159593 A1 | 7/2007 | Hibino et al. | | |
| 2010/0296050 A1* | 11/2010 | Goto | ............... | G02C 7/021 351/159.06 |
| 2011/0149233 A1 | 6/2011 | Gerligand | | |

FOREIGN PATENT DOCUMENTS

| | | | | |
|---|---|---|---|---|
| EP | 2278387 | * | 1/2011 | ............... G02C 7/04 |
| JP | S61-272717 A | | 12/1986 | |
| JP | H06-34920 A | | 2/1994 | |
| JP | H06-289329 A | | 10/1994 | |
| JP | H07-239459 A | | 9/1995 | |
| JP | H11-295668 A | | 10/1999 | |
| JP | 2005-534058 A | | 11/2005 | |
| JP | 2011-133567 A | | 7/2011 | |
| WO | 2005/040896 A1 | | 5/2005 | |
| WO | WO2014/050879 | * | 3/2014 | ............... G02C 7/044 |

OTHER PUBLICATIONS

Apr. 8, 2014 International Search Report issued in International Patent Application No. PCT/JP2014/055514.

* cited by examiner

PRIOR ART

DECENTERED TYPE CONTACT LENS AND DECENTERED TYPE CONTACT LENS SET

TECHNICAL FIELD

The present invention relates to a decentered type contact lens for which an optical center of an optical zone is made to deviate from a lens geometric center, and particularly to a contact lens equipped with a circumferential direction position setting mechanism in a worn state.

BACKGROUND ART

From the past, as one type of contact lens, an item is known that has multiple power regions with mutually different lens powers set in the optical region. For example, with a contact lens for correcting presbyopia, since the lens power required for near vision and the lens power required for far vision differ, contact lenses provided with a near sight region for which a lens power for near vision is set and a far sight region for which a lens power for far vision is set are prescribed for correction of presbyopia. In specific terms, as disclosed in Patent Document 1 (Japanese Unexamined Patent Publication No. JP-A-S61-272717), a contact lens is known having a structure for which the near sight region and the far sight region are formed in concentric circles in relation to the lens geometric center.

However, in a worn state with the contact lens overlapped on the cornea of the eye, the pupil center which is positioned on the center axis of the eye optical system is often shifted from the geometric center of the contact lens. Possible reasons for this include that since the curvature distribution of the corneal surface of the human eye is not uniform, it is easy for the contact lens to stabilize shifted to the ear side, or for the pupil center to be in an eccentric position to the nose side in relation to the geometric center of the cornea.

In this way, in a worn state, when the pupil center is shifted from the geometric center of the contact lens, as noted in Patent Document 1 noted above, with a contact lens of a conventional structure for which a near sight region and a far sight region are provided concentrically with the lens geometric center, there was the problem that it was difficult to obtain sufficient quality of vision (QOV). In light of that, this applicant proposed a decentered type contact lens for which the optical center axis of the optical region is made to deviate to the nose side from the lens geometric center with Japanese Unexamined Patent Publication No. JP-A-H06-289329 (Patent Document 2). With this contact lens noted in Patent Document 2, it is possible to suppress the distance between the pupil center and optical center axis in a worn state, and to obtain an improved QOV.

However, as noted in Patent Document 2, in regards to the decentered type contact lens, when the inventor did additional investigation, they found that there are cases when it is difficult to stably obtain sufficient effect in terms of improved QOV, and that there was still room for improvement.

BACKGROUND ART DOCUMENT

Patent Document

Patent Document 1: JP-A-S61-272717
Patent Document 2: JP-A-H06-289329

SUMMARY OF THE INVENTION

Problem the Invention Attempts to Solve

The present invention has been developed in view of the above-described matters as the background, and it is an object of the present invention to provide a contact lens with a novel structure which is able to provide more stable exhibition of the effect of improving the QOV which is the object of the decentered type contact lens.

Means for Solving the Problem

To address this problem, as a result of the inventors doing a great deal of experimenting and investigation, it was possible to confirm the fact that with decentered type contact lenses, the circumferential direction position in the worn state is often shifted from the intended position, and because of that, the decentered optical center separates from the pupil center, so there are cases when it is difficult to obtain the target QOV.

However, from the start, for decentered type contact lenses, a known circumferential direction alignment means such as double thin or the like is provided to set the circumferential direction position in the worn state. When the inventors did further research regarding the reason for this circumferential direction alignment means not functioning with sufficient stability, they found that a big reason is that the center-of-gravity position of the lens is shifted from the lens geometric center due to setting of the decentering that deviates the optical center axis of the optical region from the lens geometric center.

Then, accompanying the decentering setting, by the center-of-gravity position of the contact lens being shifted from the center-of-gravity position of the initial design which is not decentered, the position of the contact lens on the cornea when worn changes based on gravitational action, and with this as a big reason, there were cases when it was difficult to achieve a satisfactory sense of fit or wearing comfort.

To understand this kind of novel technical concept that is the basis for the present invention, as one specific example, we will explain this assuming a decentered type contact lens 1 as shown in FIGS. 31 to 33. This contact lens 1 has an optical zone 2 provided at the center, and by having a first power region 3 for which a minus diopter correction power for near vision is set formed at the center part of that optical zone 2, and also having a second power region 4 for which a correction power for distance vision is set that is a smaller power than the correction power for near vision formed on the outer circumference side of the first power region 3, this is a bifocal lens. Also, by having the external shape center of the first power region 3 (roughly the same position as the optical center of the optical zone 2 with this example) be deviated in one radial direction (right side with the lateral radial direction in FIG. 33) from a lens geometric center 5 which is the lens external shape center, this is the decentered type contact lens 1 for which the optical center of the optical zone 2 is deviated from the lens geometric center 5. Also, the outer circumference side of the optical zone 2 is an annular shaped peripheral zone 6 extending to the lens circumferential direction at a designated width, and a circumferential direction alignment mechanism for setting the circumferential direction position of the contact lens 1 is provided. With this contact lens 1, as the circumferential direction alignment mechanism, a double slab-off structure is used, and while a pair of thin parts 7, 7 are formed in the vertical direction in the worn state, a pair of thick parts 8, 8 are formed in the lateral direction in the worn state.

Also, with this contact lens 1, the center-of-gravity position with the initial design with no decentering set to the lens geometric center 5. Using the double slab-off structure of the peripheral zone 6, the radial direction lines facing opposite the pair of thin parts 7, 7 becomes the vertical direction, and the radial direction lines facing opposite the pair of thick parts 8, 8 become the horizontal direction. This design is made so as to be aligned in the circumferential direction in the state shown in FIG. 31. However, by setting decentering for a optical zone 2, a center-of-gravity position 9 of the contact lens 1 is separated from the lens geometric center 5, and the alignment is made to deviate by an amount of designated distance Xw to the side opposite to the optical center of the first power region 3 (left side in FIG. 31).

Based on investigation by the inventors, it was possible to find a relationship between the deviation amount of this center-of-gravity position 9 and the amount of positional shift from the intended setting position when wearing. Specifically, with the contact lens in the worn state, by the gravitational action that accompanies setting of decentering, due to rotational moment or translation force being applied, the lens position is shifted from the intended setting position. This shift causes separation of the optical center intended to be set so as to be positioned at the pupil center from that, and it is thought that it is difficult for the target QOV improvement effect to be exhibited. Also, the deviation amount and deviation direction of the center-of-gravity position 9 each differ according to the optical characteristics and optical center decentering volume set for the optical zone 2, so the contact lens position shift state is different with the worn state regardless of the tear fluid status or the like of the wearer, and it is thought that this made it difficult to have stable exhibition of the target QOV improvement effect.

A first mode of the present invention created based on the findings and results as described above provides a decentered type contact lens including: an optical zone provided in a center part of the contact lens; a peripheral zone provided on an outer circumference of the optical zone; an optical center of the optical zone being set to deviate from a lens geometric center; and a circumferential direction alignment mechanism for setting a lens circumferential direction position in a worn state, the contact lens being characterized in that: a center-of-gravity deviation in relation to the lens geometric center is set for the peripheral zone, and a center-of-gravity position shift accompanying deviation of the optical center of the optical zone in relation to the lens geometric center is corrected by offset using the center-of-gravity deviation of the peripheral zone.

With the decentered type contact lens constituted according to this mode, the center-of-gravity deviation that accompanies setting of decentering that was newly found through consideration by the inventors can be effectively reduced by skillfully using the peripheral zone that does not have a direct effect on the optical characteristics. Because of that, with the decentered type contact lens, the center-of-gravity position that, in a manner of speaking, moved unexpectedly along with decentering, is corrected so as to be near the lens geometric center which is the initially set position, and it is possible to suppress the shift volume of the center-of-gravity position from the initially set position to a small amount. By so doing, when wearing a contact lens, the contact lens is positioned with good precision to the initially set position, and by the circumferential direction alignment effect such as with double thin or the like being exhibited well, the original worn state is exhibited stably.

As a result, it is possible to effectively reduce or eliminate problems thought to be due to setting of decentering such as shifting of the optical center from the intended position, major movement of the lens when blinking or the like, so the contact lens becomes stable at the target position in the worn state, and there is effective and stable exhibiting of the target QOV improvement effect and the wearing comfort improvement effect due to setting of decentering.

As the previously described lens geometric center position and lens center-of-gravity position and the like, with this specification, we will describe this using the distance on the XY plane which is the perpendicular surface to the surface including the lens axis.

A second mode of the present invention provides the decentered type contact lens according to the first mode, wherein the center-of-gravity deviation of the peripheral zone is set by changing a radial direction cross section shape of the peripheral zone in a circumferential direction such that both side parts opposite in a diametrical direction in which the center-of-gravity deviation is set are made mutually different in terms of at least one of a peripheral zone thickness dimension, width dimension, and diametrical direction center-of-gravity position.

With the decentered type contact lens constituted according to this mode, it is possible to set the center-of-gravity deviation of the peripheral zone using a simple structure based on a symmetrical shape, and an efficient and excellent freedom of design is achieved. In particular, since it is acceptable for both side parts in the radial direction to be different from each other, it is possible to change the shape of only one side of the radial direction, or possible to set the center-of-gravity deviation of the peripheral zone with both side parts in the radial direction working together.

Making the peripheral zone thickness dimension, the width dimension, and the radial direction center-of-gravity position mutually different at both side parts in the radial direction is realized by making the peripheral zone cross section shape different. By making the thickness dimension or width dimension relatively large, it is possible to set movement of the lens center-of-gravity position to the side made larger, and by relatively separating the radial direction center-of-gravity position from the lens geometric center to the outer circumference side, it is possible to set the movement of the lens center-of-gravity position to the separated side.

A third mode of the present invention provides the decentered type contact lens according to the first or second mode, wherein the optical zone has at least one of optical characteristics for correcting far and near, optical characteristics for correcting astigmatism, optical characteristics for correcting aberration, and optical characteristics for inhibiting myopia progression with an eye optical system.

As optical characteristics for the optical zone of the decentered type contact lens constituted according to this mode, there are optical characteristics for correcting far and near, optical characteristics for correcting astigmatism, optical characteristics for correcting aberration, and optical characteristics for inhibiting myopia progression and the like, and depending on the optical characteristics of this optical zone, contact lenses having various characteristics can be used, such as multifocal lenses that are bifocal or multifocal for both far and near vision designed as a refractive type or diffractive type, progressive lenses for which the lens power changes gradually, toric lenses for correcting astigmatism, lenses having coma aberration power distribution for correcting irregular astigmatism, contact lenses with aberration control using an aspherical expression or Zernike polynomial expression, a lens for inhibiting myopia progression that suppresses myopia progression or the like. In particular, compared to a simple single focal lens, since it is easier for the QOV improvement effect to be exhibited when the optical characteristics as noted above are set for the optical zone, the effect by using correction of the center-of-gravity position can be enjoyed to a further level of advantage.

A fourth mode of the present invention provides the decentered type contact lens according to any of the first to third modes, wherein the center-of-gravity deviation with the peripheral zone is set by a shape of a lens front surface.

With the decentered type contact lens structured according to this mode, the center-of-gravity deviation provided to the peripheral zone is realized simply by setting a specific shape of the lens front surface, so the structure is simple, and designing and manufacturing of the contact lens is easy. In particular, when the contact lens is manufactured using cutting processing, since only the lens front surface is cut, it is possible to lower the processing error accompanying re-gripping of the work and the like. Also, when the contact lens is manufactured using mold forming, it is possible to lower the number of types of mold for the back surface side. In fact, by having the shape of the lens back surface overlapping the cornea when wearing be roughly fixed regardless of the volume of deviation of the center of gravity, it is possible to keep a roughly equal good wearing comfort regardless of the center-of-gravity deviation setting volume.

A fifth mode of the present invention provides the decentered type contact lens according to any of the first to fourth modes, wherein the circumferential direction alignment mechanism is constituted by at least one of a double slab-off having on the peripheral zone a pair of thin parts positioned vertically and a pair of thick parts positioned laterally, a periballast for which the pair of thick parts with the double slab-off are deviated respectively downward, a prism ballast by which lens front and back surfaces are shifted along a region including the optical zone and the peripheral zone making a bottom thicker, and a truncation of a shape for which at least one of a top or bottom end edge part of the lens is cut in roughly a chord direction.

With the decentered type contact lens constituted according to this mode, by using a suitable combination as necessary of the various structures noted above, which are conventionally known as the circumferential direction alignment mechanism, designing of the lens shape including the peripheral zone is easy.

A sixth mode of the present invention provides the decentered type contact lens according to any of the first to fifth modes, wherein the circumferential direction alignment mechanism is constituted by providing on the peripheral zone a pair of thin parts positioned vertically and a pair of thick parts positioned laterally, and the center-of-gravity deviation in relation to the lens geometric center is set by having relatively different shapes for at least one of between the pair of thick parts and between the pair of thin parts.

With the decentered type contact lens constituted according to this mode, by skillfully using the pair of thin parts and the pair of thick parts that constitute the circumferential direction alignment mechanism, it is possible to efficiently realize the center-of-gravity deviation for correcting the center of gravity movement due to setting decentering. In particular, with both the pair of thin parts and the pair of thick parts, by making the respective shapes different to each other, it is also possible to set the center-of-gravity deviation in any direction of top, bottom, left or right, and it is possible to efficiently achieve offset correction of center of gravity movement that accompanies various designs of the optical zone.

A seventh mode of the present invention provides the decentered type contact lens according to any of the first to sixth modes, wherein the optical zone has plus diopter correction optical characteristics with the optical center being set with the deviation from the lens geometric center, and the center-of-gravity deviation provided at the peripheral zone is set to a side opposite an optical center deviation direction in relation to the lens geometric center.

With the decentered type contact lens constituted according to this mode, by having the optical center of the region having plus diopter correction optical characteristics deviate from the lens geometric center, the center-of-gravity position shift in relation to the optical zone lens geometric center is caused in the same direction as the deviation direction of the optical center, so by setting the peripheral zone center-of-gravity deviation in the direction opposite to the deviation direction of the optical center, it is possible for the gravity position shift of the optical zone center to be corrected by offset.

An eighth mode of the present invention provides the decentered type contact lens according to any of the first to sixth modes, wherein the optical zone has minus diopter correction optical characteristics with the optical center being set with the deviation from the lens geometric center, and the center-of-gravity deviation provided at the peripheral zone is set to the same side as an optical center deviation direction in relation to the lens geometric center.

With the decentered type contact lens constituted according to this mode, by having the optical center of the region having minus diopter correction optical characteristics deviate from the lens geometric center, since center-of-gravity position shift in relation to the optical zone lens geometric center is caused in the reverse direction to the deviation direction of the optical center, by setting the peripheral zone center-of-gravity deviation in the same direction as the deviation direction of the optical center, the center-of-gravity position shift of the optical zone can be corrected by offset.

A ninth mode of the present invention provides the decentered type contact lens according to any of the first to eighth modes, wherein a deviation distance of the optical center of the optical zone from the lens geometric center is 0.4 mm or greater.

With the decentered type contact lens constituted according to this mode, a relatively large center-of-gravity deviation is caused when decentering of the optical zone is set, and problems such as a decrease in the QOV or wearing comfort occur easily. However, even with that kind of contact lens, by using a correction structure for the center-of-gravity position shift of the present invention, it is possible to sufficiently improve the decrease in QOV or wearing comfort due to setting of decentering.

A tenth mode of the present invention provides the decentered type contact lens according to any of the first to ninth modes, wherein the center-of-gravity position shift accompanying the deviation of the optical center of the optical zone in relation to the lens geometric center is corrected by offset using the center-of-gravity deviation of the peripheral zone, and a shift rate of a lens center-of-gravity position in relation to the lens geometric center is set to be 2% or less.

With the decentered type contact lens constituted according to this mode, it is possible to have stable exhibiting of the positioning effect at the intended circumferential direction position. This is probably because, when the shift rate of the center-of-gravity position from the lens geometric center after offset correction of the center-of-gravity position shift due to the center-of-gravity deviation of the peripheral zone is greater than 2%, there is a risk of not being able to obtain the desired optical characteristics, such as by the center-of-gravity position not being corrected sufficiently, and the contact lens at the time of wearing fluctuating, or being stabilized at a circumferential direction position which was not the target. Note that the "shift rate of the lens center-of-gravity position in relation to the lens geometric center" is the distance (shift volume) between the lens geometric center after correction in relation to the lens outer diameter dimension (DIA.) and the lens center-of-gravity position expressed as a percentage.

An eleventh mode of the present invention provides the decentered type contact lens according to any of the first to tenth modes, wherein a pair of thick parts positioned laterally on the peripheral zone are provided, and the center-of-gravity deviation is set by having different thickness dimensions between the pair of thick parts, and by setting a thickness dimension difference between the pair of thick parts to be within a range of 0.01 to 0.1 mm.

With the decentered type contact lens constituted according to this mode, by the thickness dimension difference of the pair of thick parts being 0.01 mm or greater, the center-of-gravity position correction effect is exhibited more effectively, and by the thickness dimension difference of the pair of thick parts being 0.1 mm or less, the eyelid pressure action applied to both left and right side thick parts is suitably balanced, and it is possible to have further improvement in the lens circumferential direction alignment effect and wearing comfort.

A first mode relating to a decentered type contact lens set of the present invention provides a decentered type contact lens set including a plurality of contact lenses according to any one of the first to eleven modes which are assorted by different lens power specific values for correction applied to the optical zone thereof, the decentered type contact lens set being characterized in that: with the plurality of contact lenses, respective sizes of the center-of-gravity deviation set for the peripheral zone vary in correspondence with the respective lens power specific values for correction set for the optical zone.

With the decentered type contact lens set constituted according to this mode, a plurality of types of items for which the standard value of the lens power is made to be different for the decentered type contact lens are combined, so it is possible to select a suitable contact lens for the user from among the plurality of types. Also, since the size of the center-of-gravity deviation is set according to the standard value of the lens power, it is possible to prevent the types of contact lenses constituting the contact lens set from branching more widely than necessary. In particular, by using a size roughly corresponding to the standard value of the lens power, a shift in the center-of-gravity position due to setting of decentering is caused, so the offset correction value of the center-of-gravity deviation according to that can be efficiently set corresponding to the standard value of the lens power.

Effect of the Invention

With the decentered type contact lens according to the constitution of the present invention, by setting center-of-gravity deviation of the peripheral zone in relation to center-of-gravity position shift due to deviation of the optical center of the optical zone from the lens geometric center, it is possible to correct the center-of-gravity position shift using offset, and to suppress the contact lens center-of-gravity position shift to a small level. As a result, it is possible to achieve further improvement and stabilization of the QOV and wearing comfort which were problems with the conventional decentered type contact lenses.

EMBODIMENTS FOR CARRYING OUT THE INVENTION

Following, we will give a detailed description of embodiments of the present invention while referring to drawings to more clearly specify the present invention.

Figure 1:
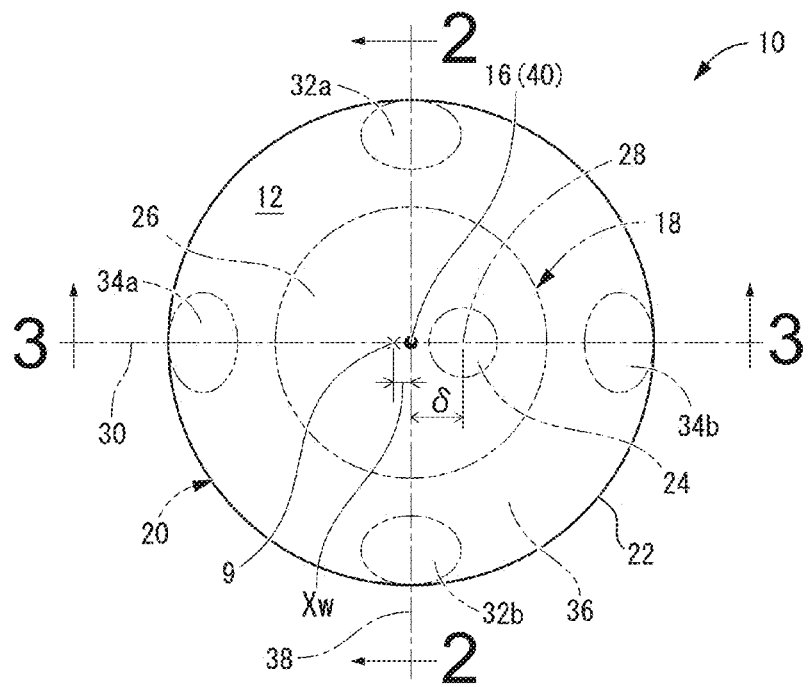
FIG. 1 is a front view showing a contact lens as a first embodiment of the present invention.
Figure 2:
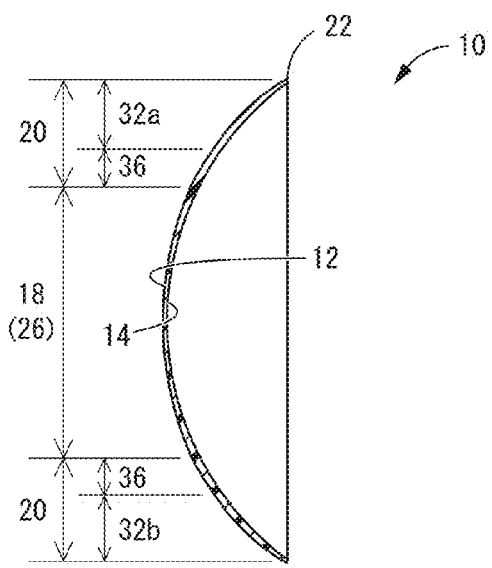
FIG. 2 is a cross section view taken along line 2-2 of FIG. 1.
Figure 3:
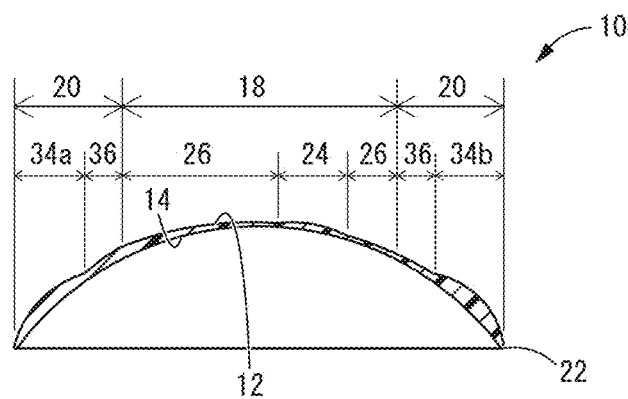
FIG. 3 is a cross section view taken along line 3-3 of FIG. 1.

First, FIGS. 1 to 3 show a contact lens 10 as a first embodiment of the present invention. This contact lens 10 overall has a partial shape of a roughly spherical shell, and as is well known, is used by wearing it as overlapped on the surface of the cornea of the eyeball. The contact lens 10 shown in FIG. 1 is one for use in the right eye, and in the worn state, the vertical direction of the contact lens 10 is the vertical direction in FIG. 1, while the nose side is the right side in FIG. 1, and the ear side is the left side in FIG. 1. Also, with the explanation below, the lens geometric center, a lens center-of-gravity position and the like are assumed to be in a XY plane perpendicular to the lens axial direction (vertical direction in FIG. 3), and the description will be done using the distance on that XY plane.

The present invention can also be applied to either of soft type and hard type contact lenses. The material is not limited to a particular material, either. For a soft type contact lens, it is possible to use a non-hydrated material etc. such as acrylic rubber or silicone, in addition to a hydrated material, which has been known from the past, such as PHEMA (polyhydroxyethylmethacrylate) or PVP (polyvinylpyrrolidone). In particular, it is also possible to use this for a hard contact lens consisting of a rigid gas permeable lens (RGP lens) or the like made of PMMA (polymethylmethacrylate), SiMA/MMA polymer, or the like. Furthermore, it is also possible to use a two material contact lens having the features of both hard type and soft type lenses, and it is also possible to use a compound material formed from the respective materials for hard type lenses and soft type lenses.

In more specific detail, the contact lens 10 has a circular shape with the front view shown in FIG. 1, and as shown in FIGS. 2 and 3, has a roughly convex spherical lens front surface 12, and a roughly concave spherical lens back surface 14. Also, this contact lens 10, in terms of structure, is constituted by an optical zone 18 that expands in roughly a circle from a lens geometric center 16 with a front view at the center part, a peripheral zone 20 that expands roughly in a ring shape with a front view as surrounding the optical zone 18, and an edge part 22 that connects the lens front and back surfaces 12 and 14 and is positioned at the lens outermost circumference edge part in the periphery of the peripheral zone 20.

The optical zone 18 is given an optical surface shape of a spherical surface with a suitable curvature radius or an aspherical surface as a base for the lens front surface 12 and the lens back surface 14 so as to realize, for example, lens power monofocal or multifocal with two or more focal points as required optical characteristics such as vision correction function or the like.

The curvature distribution of the corneal surface of the human eye is not uniform, so that the contact lens tends to be shifted toward the ear side. The pupil center has an eccentric position toward the nose side to the geometric center of the cornea. Due to reasons including them, in the worn state with the contact lens overlapped on the cornea of the human eye, the pupil center, which is positioned on the center axis of the eye optical system, is often unintentionally shifted from the geometric center of the contact lens. Also, when using a bifocal lens of an alternative vision type as the contact lens, it is preferable to have the optical center intentionally shifted toward the nose side or downward in relation to the lens geometric center. Considering this kind of shifting, with the contact lens 10, the optical center of the optical zone 18 is positioned deviated in relation to the lens geometric center 16, and the contact lens 10 is a decentered type contact lens.

Specifically, with this embodiment, the optical zone 18 is made to be an optical region having an optical center with deviation set in relation to the lens geometric center 16, and a circular first power region 24 with a first lens power set is provided at the center part of the optical zone 18. The peripheral part of the first power region 24 in the optical zone 18 is used as a second power region 26 for which a second lens power is set. In particular, with this embodiment, a lens power for near vision is set as the first lens power, while a lens power for far vision is set as the second lens power. Specifically, a roughly fixed minus diopter value is set as the first lens power, while a roughly fixed minus diopter value that is smaller than the first lens power is set as the second lens power. Therefore, the contact lens 10 of this embodiment is a bifocal lens having two focal points.

Also, the optical center of the optical zone 18 is positioned at roughly the same position as an external shape center 28 of the first power region 24, and that external shape center 28 is made to deviate from the lens geometric center 16. With this embodiment, the external shape center 28 of the first power region 24 is positioned on a horizontal diametrical line 30 that passes through the lens geometric center 16, and is made to deviate by an amount δ (see FIG. 1) to the nose side from the lens geometric center 16. By so doing, when the contact lens 10 is in a worn state, the external shape center 28 of the first power region 24 and the pupil center line of the eye the lens is worn on are made to overlap.

Typically, the horizontal direction shift between the lens geometric center 16 and the pupil center line of the eye the lens is worn on is about 0.5 mm to 1.5 mm with a front view. Therefore, the separation distance δ between the lens geometric center 16 and the external shape center 28 of the first power region 24 is preferably in a range of 0.4 mm≤δ, more preferably in a range of 0.5 mm≤δ≤4.0 mm, and even more preferably in a range of 0.5 mm≤δ≤2.0 mm, and with this embodiment, δ=1.0 mm. This is because if δ is less than 0.4 mm, the center-of-gravity position shift volume Xw accompanying deviation of the optical center of the optical zone 18 (2) from the lens geometric center 16 (5) is too small, and there is the risk of failing to obtain a sufficient correcting effect by the center-of-gravity deviation set for the peripheral zone 20 described hereafter.

Furthermore, a circumferential direction alignment mechanism is provided on the contact lens 10 to set the lens circumferential direction position in the worn state, and with this embodiment, a double slab-off structure is used. Specifically, the radial direction cross section shape of the peripheral zone 20 of the contact lens 10 is made to change in the circumferential direction, and a pair of thin parts 32a and 32b are provided in the vertical direction, while a pair of thick parts 34a and 34b are provided in the lateral direction. Also, the area between the thin parts 32a and 32b and the thick parts 34a and 34b in the circumferential direction is used as a transition region 36 for smooth changing of the lens thickness. With this embodiment, the change in thickness of the peripheral zone 20 as described above is realized by applying changes in thickness to the lens front surface 12. Naturally, the thickness changes of the peripheral zone 20 can also be applied as thickness changes to the lens back surface 14, or the thickness changes can be allotted to both the lens front and back surfaces 12 and 14. Also, the first power region 24, the thin parts 32a and 32b, and the thick parts 34a and 34b shown in FIGS. 2 and 3 are illustrated with a curvature greater than in reality to make it easier to see.

These thin parts 32a and 32b and thick parts 34a and 34b are formed partially on the circumference continuously in the circumferential direction, and with the front view, these are formed line-symmetrically in relation to a horizontal diametrical line 30 as well as a vertical diametrical line 38 that is orthogonal to the horizontal diametrical line 30. In FIG. 1, chain double-dashed lines indicating the thin parts 32a and 32b and the thick parts 34a and 34b show the regions that are specifically thin walled and thick walled to make it easier to understand, and do not limit the regions that are thin walled and thick walled.

Figure 4:
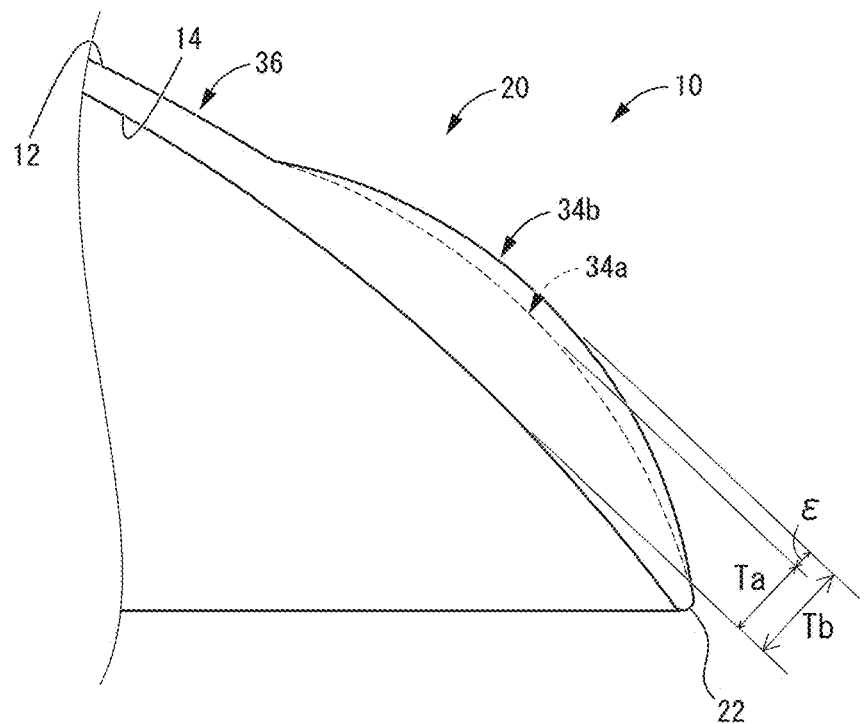
FIG. 4 is a view suitable for showing the difference in the thickness dimension of the pair of thick parts with the contact lens shown in FIG. 1, wherein cross section shapes of both thick parts are mutually overlapped.

Here, with the contact lens 10 of this embodiment, as shown in FIG. 4, the thickness dimension of one thick part 34b (on the right side in FIG. 1) is made to be larger than the other thick part 34a (on the left side in FIG. 1). Specifically, if the thickness dimension of the other thick part 34a is Ta and the thickness dimension of the one thick part 34b is Tb, then Ta<Tb. In particular, the thickness dimension difference ε between the pair of thick parts 34a and 34b (specifically, Tb−Ta), is preferably set in a range of 0.01 mm≤ε≤0.1 mm, and more preferably in a range of 0.03 mm≤ε≤0.07 mm. This is because if ε is less than 0.01 mm, there is the risk that the center-of-gravity deviation is not caused at the peripheral zone 20, and there will not be sufficient exhibiting of the correction effect of the center-of-gravity position shift described later. Also, if ε is greater than 0.1 mm, the part at the eyelid of the eye the lens is worn on is different at left and right with the contact lens 10, and there is the risk that there will be a decrease in the circumferential direction alignment effect by the eyelid pressure, thereby leading to stabilization with an unexpected inclination and fluctuation of the contact lens 10 when wearing, and it will not be possible to obtain the desired optical characteristics.

Figure 31:
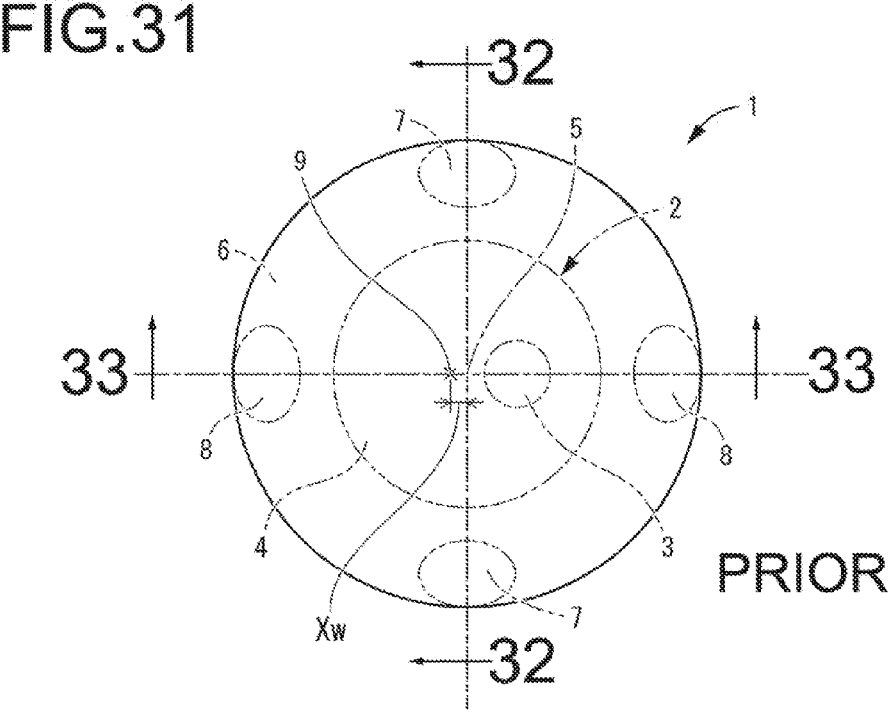
FIG. 31 is a view suitable for explaining a center-of-gravity position of a decentered type contact lens of a conventionally known structure, and a front view of the contact lens using a double slab-off structure as a circumferential direction alignment mechanism.
Figure 32:
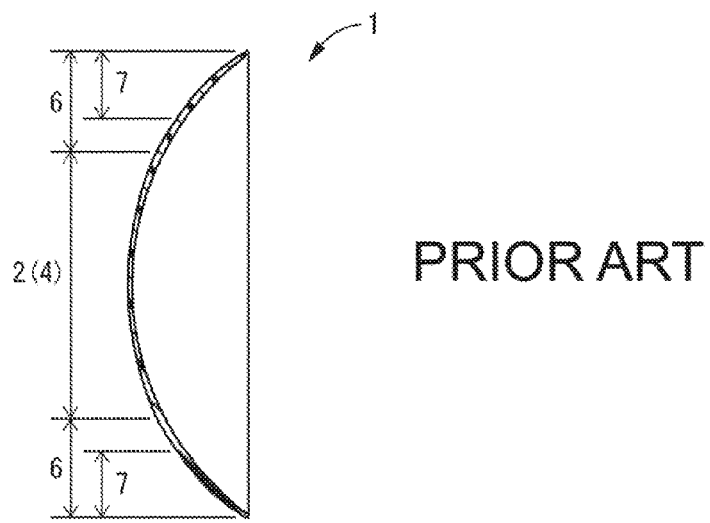
FIG. 32 is a cross section view taken along line 32-32 of FIG. 31.
Figure 33:
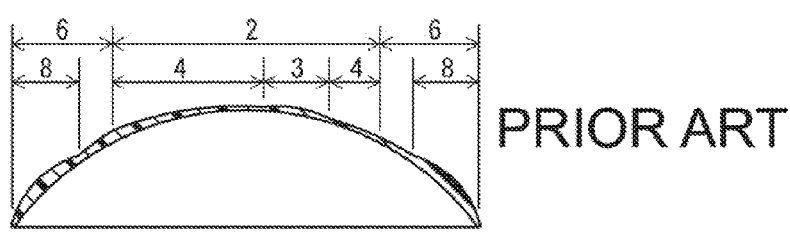
FIG. 33 is a cross section view taken along line 33-33 of FIG. 31.

With the contact lens 10 having a shape like that noted above, the center-of-gravity deviation is set in relation to the lens geometric center 16 for the peripheral zone 20 by having the thickness dimension of the right side thick part 34b be relatively bigger than the thickness dimension of the left side thick part 34a. By so doing, compared to the contact lens 1, as shown in FIG. 31 for which the left and right thick parts have the same shape, the overall lens center-of-gravity position is deviated to the right. Specifically, with FIG. 31, the center-of-gravity position 9 is positioned to the left in relation to the lens geometric center 5 (16), but by center-of-gravity deviation being caused to the right of the peripheral zone 20 with the thickness dimension of the right side thick part 34b being made larger in relation to the left side thick part 34a, a center-of-gravity position 40 of the contact lens 10 of this embodiment is corrected by offset to the right in relation to the center-of-gravity position 9, and in the drawing, is substantially overlapped on the lens geometric center 16. Naturally, it is not absolutely necessary to match the lens geometric center 16 and the center-of-gravity position 40, and the effect of the present invention described later can be exhibited by having the lens geometric center 16 be near the center-of-gravity position 40. In FIG. 1, to make it easier to understand, the center-of-gravity position 9 of the contact lens 1 shown in FIG. 31 is shown together. Also, the contact lenses 1 and 10 can be virtually produced on a computer, for example, and these center-of-gravity positions 9 and 40 can be calculated by using 3D CAD software such as SolidWorks made by Dassault Systémes SOLIDWORKS Corp. Alternatively, it is possible to calculate the center-of-gravity positions from the design values using the formulas below.

$$Xw = \Sigma(m_i \cdot x_i)/\Sigma m_i$$

$$Yw = \Sigma(m_i \cdot y_i)/\Sigma m_i$$

Here, Xw is the center-of-gravity position shift volume in the X axis direction (the lateral direction in FIG. 1), Yw is the center-of-gravity position shift volume in the Y axis direction (the vertical direction in FIG. 1), $m_i$ is the mass, and the position in the micro region i is $(x_i, y_i)$.

Figure 5:
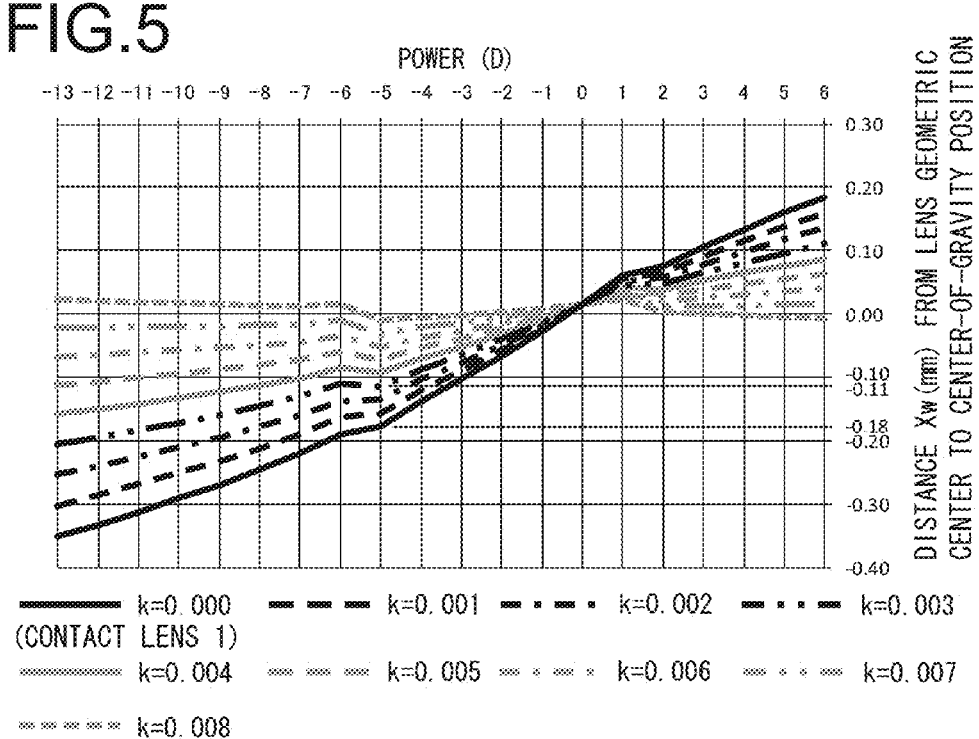
FIG. 5 is a graph suitable for explaining the relationship between the distance from a lens geometric center to a center-of-gravity position and the lens power in the contact lens shown in FIG. 1, for which the value of a coefficient k is changed by 0.001 at a time from 0.000 to 0.008.

This kind of center-of-gravity position shift volume Xw in relation to the lens geometric center (see FIGS. 1 and 31) can be understood as a function of the base power set for the contact lens. Specifically, with the contact lens 1 shown in FIG. 31, the shift volume Xw of the center-of-gravity position 9 in relation to the lens geometric center 5 is a function of the lens power set for the second power region 4 which is the base power. When the lens power of the second power region 4 is set to −5.0 D, as shown by the black solid line graph in FIG. 5 (k=0.000, k is a coefficient described later), the distance Xw between the lens geometric center 5 and the center-of-gravity position 9 is 0.18 mm. The vertical axis in the graph of FIG. 5 indicates the distance Xw (mm) from the geometric center to the center-of-gravity position. This presents, as the vertical axis value becomes larger, the center-of-gravity position is further shifted to the nose side, and as the vertical axis value becomes smaller, it is further shifted to the ear side. Also, when the center-of-gravity position is shifted to the ear side, the vertical axis value is represented with a negative numerical value, but the distance from the geometric center to the center-of-gravity position is the absolute value thereof.

Figure 6:
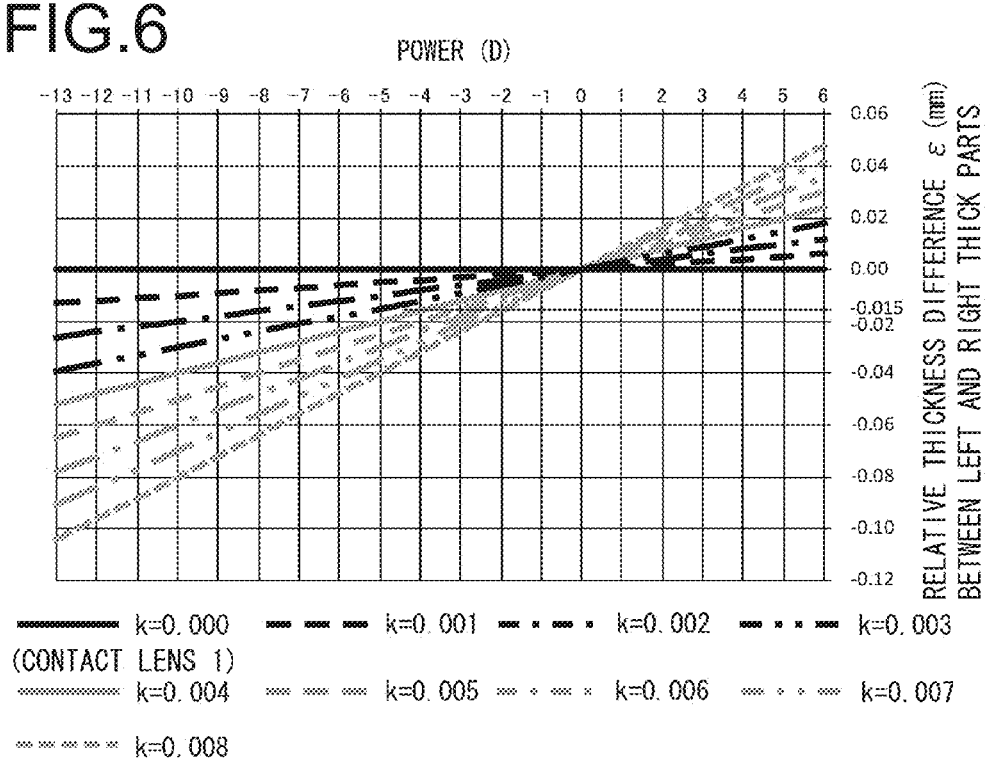
FIG. 6 is a graph suitable for explaining the relationship between the relative thickness dimension difference c of the left and right thick parts with the contact lens shown in FIG. 1 and the lens power of the contact lens, for which the value of the coefficient k is changed corresponding to FIG. 5.

By having the thickness dimension of one thick part with the contact lens 1 having this shape be relatively larger than that of the other thick part, it is possible to form the thick parts 34a and 34b for which the left and right thickness dimensions Ta and Tb are made to be different to constitute the contact lens 10 of this embodiment. The thickness dimension difference E between both thick parts 34a and 34b can be realized for example by making the thickness dimension Ta of the other thick part 34a be even bigger and having it be the thickness dimension Tb of the one thick part 34b, and the thickness dimension E added to the other thick part 34a can be understood as a function of the lens power (P) of the contact lens as shown in FIG. 6. Specifically, the thickness dimension E added to the other thick part 34a is represented by (k×P). Note that k is any coefficient that can be set, and P is the base power (D), and with this embodiment, is the second lens power set in the second power region 26. Also, in FIG. 6, the value of coefficient k is graphed at 0.001 at a time from 0.000 to 0.008, but the value of k is not limited to these whatsoever. Furthermore, the vertical axis of FIG. 6 represents the added thickness ε (mm) added to the ear side thick part 34a. When ε is a negative numerical value, the thick part 34a is made to be relatively thinner by the amount of the absolute value thickness volume, specifically, the nose side thick part 34b becomes relatively thicker.

Therefore, for example, when the second lens power is −5.0 D and k=0.003 in the setting, the added thickness ε=−0.015 (mm). Consequently, compared to the ear side thick part 34a, the nose side thick part 34b is thicker by 0.015 (mm). Also, the value of k in FIG. 5 and the value of k in FIG. 6 are corresponding items, and by setting this kind of thickness dimension difference ε, as shown by the graph of k=0.003 (black chain double-dashed line) of FIG. 5 described previously, the distance Xw from the lens geometric center 16 to the center-of-gravity position 40 is 0.11 (mm). Specifically, the center-of-gravity position shift accompanying deviation in relation to the lens geometric center 16 by the optical center of the optical zone 18 is corrected by offset using the center-of-gravity deviation of the peripheral zone 20 that accompanies changes in the thickness dimensions of the left and right thick parts 34a and 34b, and with the example noted above, the center-of-gravity position shift is corrected by 0.07 (mm) offset. In the case of k=0.000, the thickness dimension difference ε=0, and the left and right thick parts have the same shape, so that the contact lens 1 shown in FIG. 31 is represented. Also, the value of this kind of coefficient k can be set as appropriate considering the shape of the eye on which the contact lens is worn and the value of the added thickness dimension ε.

The distance Xw between the lens geometric center 16 and the center-of-gravity position 40 after the center-of-gravity position shift is corrected by offset by setting the thickness dimension difference c for the both thick parts 34a and 34b is preferably 0.25 mm or less, and more preferably 0.15 mm or less. This is because when the distance Xw between the lens geometric center 16 and the center-of-gravity position 40 is greater than 0.25 mm, there is the risk that the correction effect of the center-of-gravity position shift is not sufficiently exhibited, leading to fluctuation when wearing or stabilization at an unexpected incline, so that the desired optical characteristics cannot be obtained.

Figure 7:
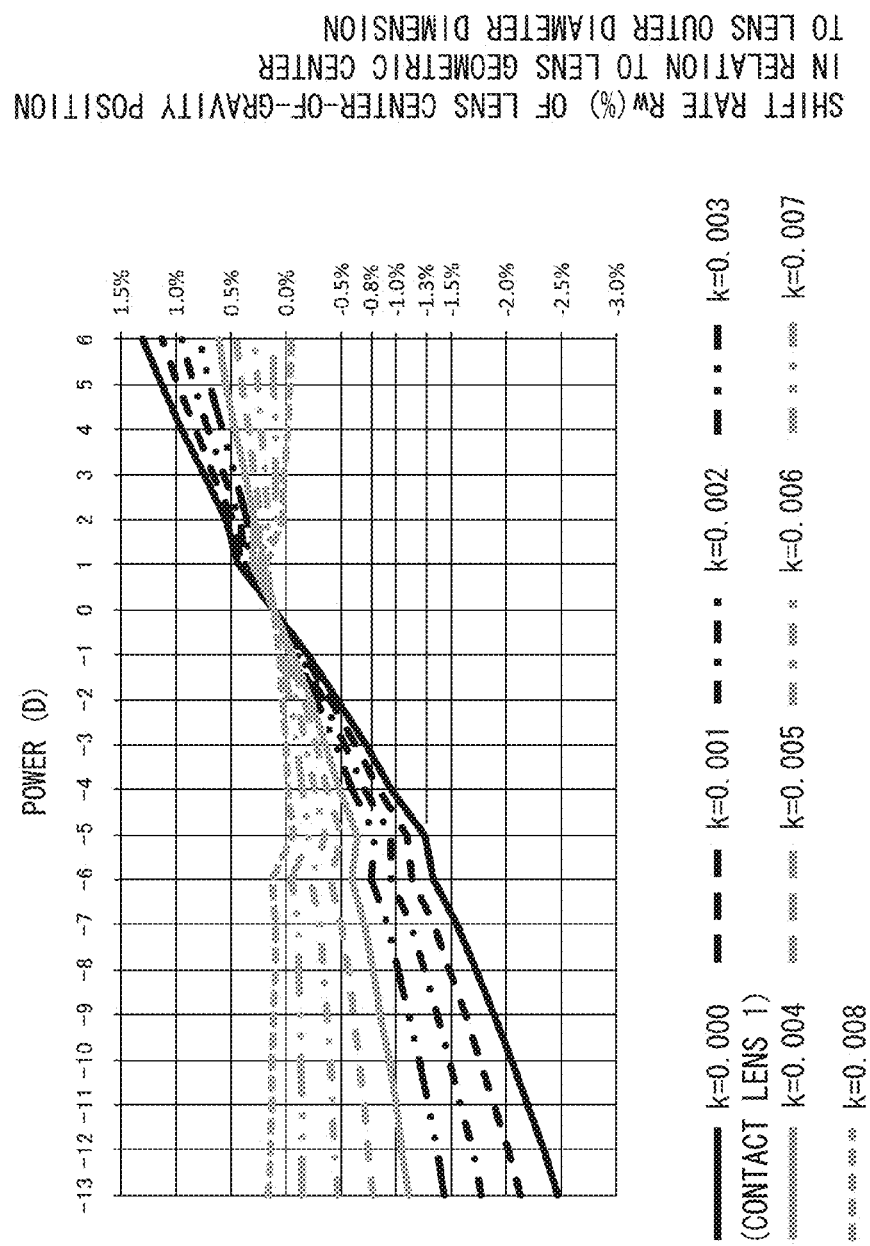
FIG. 7 is a graph suitable for explaining the relationship in the contact lens shown in FIG. 1 between the lens power and the distance from the lens geometric center to the center-of-gravity position compared to the lens outer diameter dimension, wherein the value of the coefficient k is changed corresponding to FIG. 5.

Also, the graph shown in FIG. 7 shows, as shift rate Rw (=(Xw/DIA.)×100) (%), the distance Xw between the aforementioned lens geometric center 16 and the center-of-gravity position 40 compared to the lens outer diameter dimension (DIA.) after correction by offset of the center-of-gravity position shift due to providing the thickness dimension difference ε for both the thick parts 34a and 34b. This shift rate Rw is preferably 2% or less, and more preferably 1% or less. By so doing, the correction effect of the center-of-gravity position described later is exhibited, and the desired optical characteristics can be enjoyed. The value of k in FIG. 7 corresponds to the value of k in FIGS. 5 and 6. Also, the lens outer diameter dimension (DIA.) of this embodiment is 14.2 mm.

Because the contact lens 10 of this embodiment having the shape as noted above is a decentered type one for which the optical center of the optical zone 18 is made to deviate from the lens geometric center 16, the center-of-gravity position (9) was shifted from the lens geometric center (5). However, by having the thickness dimensions Ta and Tb of the pair of thick parts 34a and 34b formed on the peripheral zone 20 be different, a center-of-gravity deviation is caused at the peripheral zone 20, and it is possible to correct the center-of-gravity position shift using offset. By so doing, it is possible to have the center-of-gravity position 40 and the lens geometric center 16 be close to each other, and to more reliably position the contact lens 10 at the intended circumferential direction position according to the circumferential direction alignment mechanism provided at the peripheral zone 20. Additionally, it is also possible to effectively avoid having the contact lens 10 fluctuate or stabilize at an unexpected incline when worn.

It is also possible to stabilize and align the optical center of the optical zone 18 of the contact lens 10 (in roughly the same position as the external shape center 28 of the first power region 24) with the pupil center line of the eye provided with the lens, thereby improving QOV. Additionally, it is possible to stabilize and align the lens geometric center 16 with the cornea center of the eye on which the lens is worn, so that it is possible to have a good sense of fit and wearing comfort.

Furthermore, with the contact lens 10 of this embodiment, the thickness dimension difference E between the both thick parts 34a and 34b with the peripheral zone 20 is set by the shape of the lens front surface 12, so that manufacturing of the contact lens 10 can be easy. Specifically, for example when the contact lens 10 is manufactured using cutting processing, by processing being implemented only on the lens front surface, it is possible to keep the processing error or the like that accompanies work re-gripping and the like to a low level, thereby improving QOV. Also, when the contact lens 10 is manufactured by mold forming, it is possible to have fewer types of molds for forming the lens back surface, and thus to reduce manufacturing costs and increase manufacturing efficiency.

Figure 8:
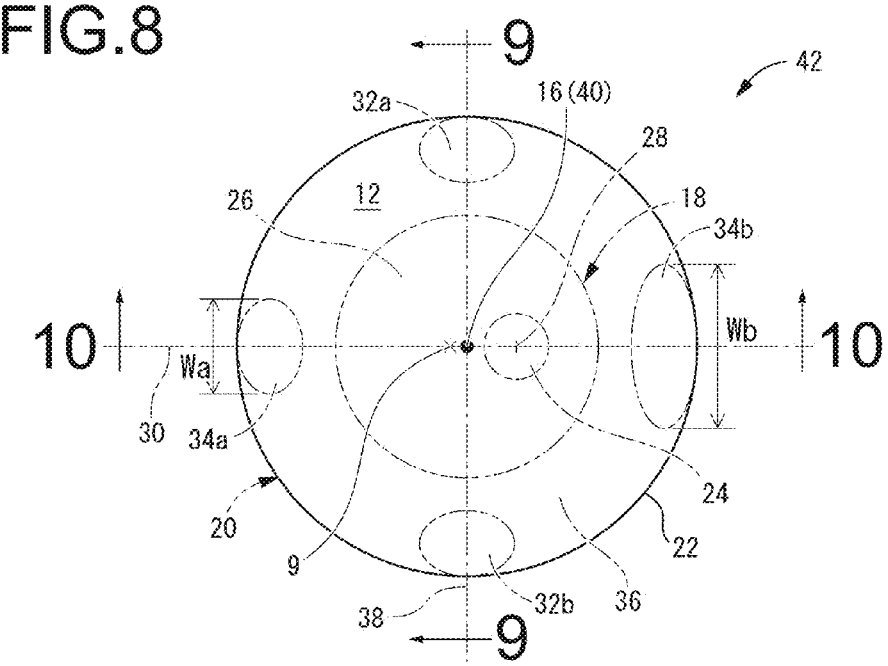
FIG. 8 is a front view showing another design of the contact lens as the first embodiment of the present invention.
Figure 9:
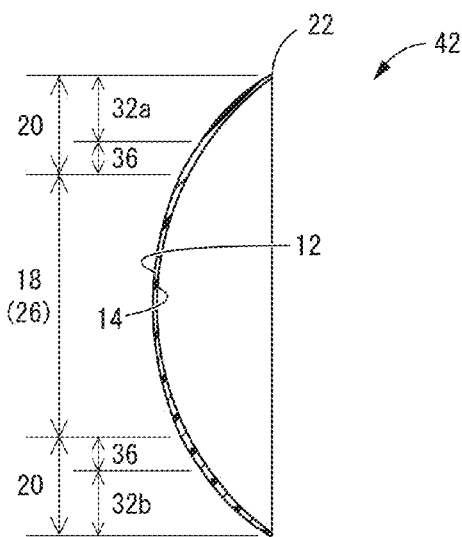
FIG. 9 is a cross section view taken along line 9-9 of FIG. 8.
Figure 10:
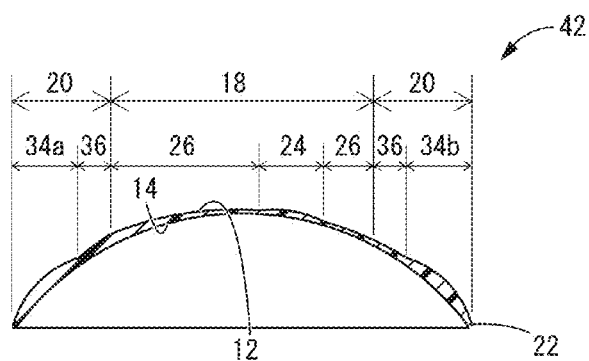
FIG. 10 is a cross section view taken along line 10-10 of FIG. 8.

Next, in FIGS. 8 to 10, a contact lens 42 of another design with this embodiment is shown. With the contact lens 10 shown in FIG. 1 described previously, by making the thickness dimensions of the left and right thick parts 34a and 34b formed on the peripheral zone 20 be different, the center-of-gravity position of the peripheral zone 20 is made to deviate, but with this design, by making the width dimensions of the left and right thick parts 34a and 34b (the vertical direction dimension in FIG. 8) be different, the center-of-gravity position of the peripheral zone 20 is deviated to the right. With the description hereafter, the same members and parts as those of the first embodiment are given the same code number as those of the first embodiment in the drawing, and a detailed description will be omitted.

Specifically, a width dimension Wb of one thick part 34b (see FIG. 8) is made to be larger than a width dimension Wa of the other thick part 34a (see FIG. 8) (Wa<Wb). By so doing, center-of-gravity deviation is set in relation to the lens geometric center 16 with the peripheral zone 20, and center-of-gravity position shift that accompanies deviation of the optical center of the optical zone 18 from the lens geometric center 16 is corrected by offset.

Figure 11:
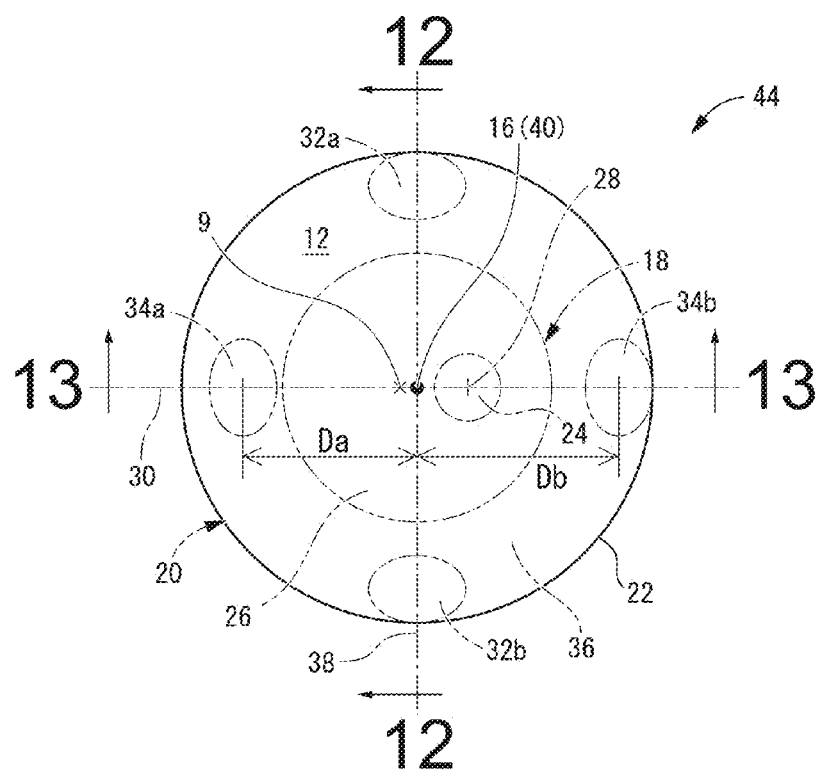
FIG. 11 is a front view showing yet another design of the contact lens as the first embodiment of the present invention.
Figure 12:
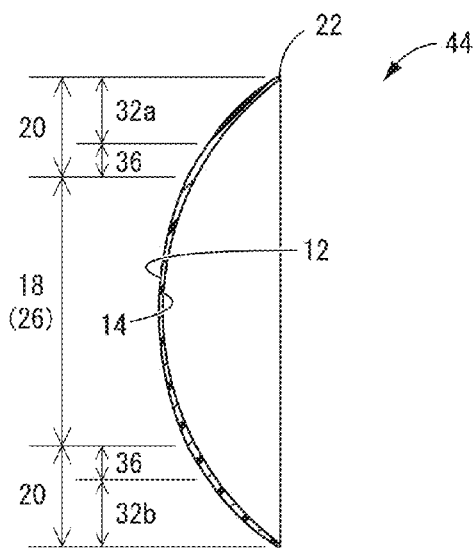
FIG. 12 is a cross section view taken along line 12-12 of FIG. 11.
Figure 13:
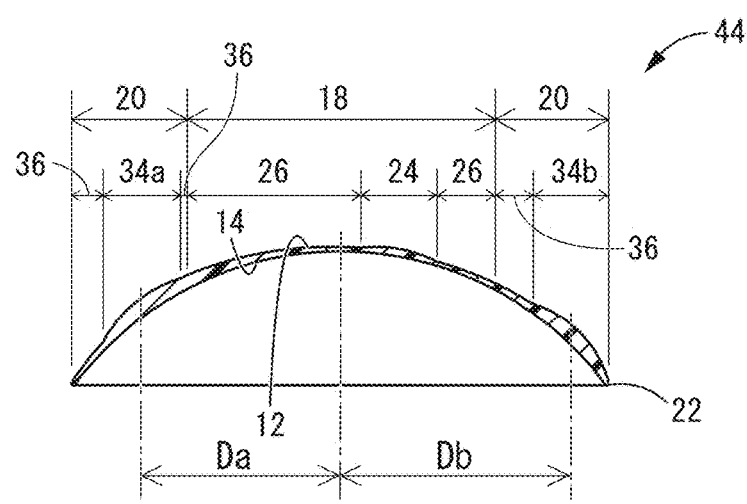
FIG. 13 is a cross section view taken along line 13-13 of FIG. 11.

Also, in FIGS. 11 to 13, a contact lens 44 of yet another design of this embodiment is shown. With this design, by changing the diametrical direction center-of-gravity position of the peripheral zone 20, the center-of-gravity deviation is set so as to correct by offset the center-of-gravity position shift. In particular, with this design, by making the radial direction distance of the left and right thick parts 34a and 34b from the lens geometric center 16 be different, the diametrical direction center-of-gravity position of the peripheral zone 20 is moved toward the right side.

Specifically, when the distance between the circumferential direction and radial direction center of the other thick part 34a and the lens geometric center 16 is Da (see FIGS. 11 and 13) and the distance between the circumferential direction and radial direction center of the one thick part 34b and the lens geometric center 16 is Db (see FIGS. 11 and 13), Da<Db. By so doing, with the peripheral zone 20, center-of-gravity deviation is set in relation to the lens geometric center 16, and the center-of-gravity position shift that accompanies deviation of the optical center of the optical zone 18 from the lens geometric center 16 is corrected by offset.

Therefore, with the contact lenses 42 and 44 constituted as noted above as well, the same effect is exhibited as with the contact lens 10 shown in FIG. 1.

Figure 14:
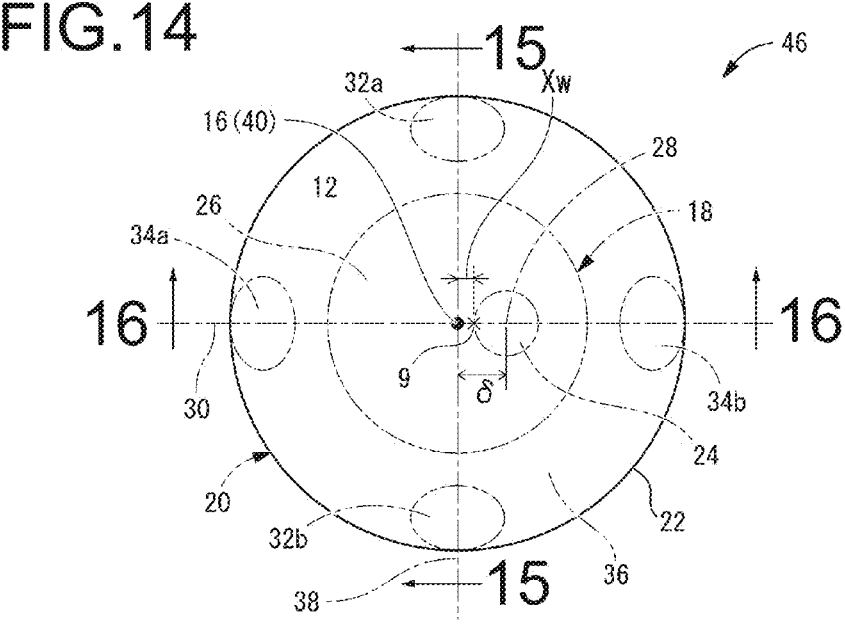
FIG. 14 is a front view showing a contact lens as a second embodiment of the present invention.
Figure 15:
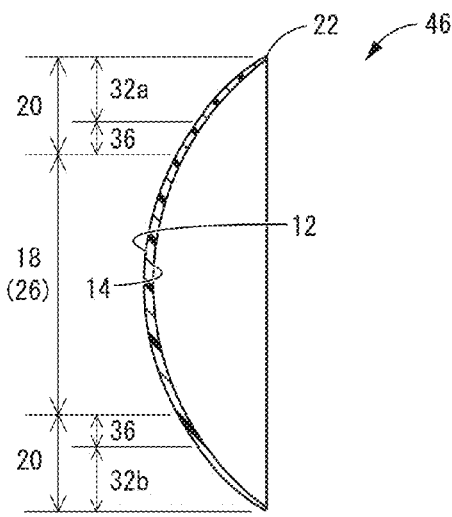
FIG. 15 is a cross section view taken along line 15-15 of FIG. 14.
Figure 16:
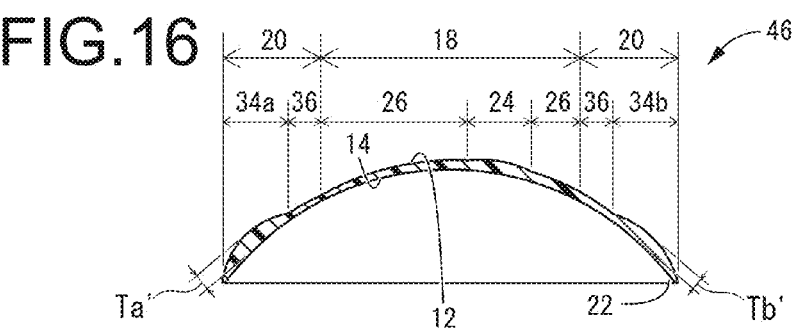
FIG. 16 is a cross section view taken along line 16-16 of FIG. 14.

Next, a contact lens 46 as a second embodiment of the present invention is shown in FIGS. 14 to 16. With this embodiment, a plus diopter near distance use lens power is set as the first lens power set for the first power region 24, while a plus diopter far distance use lens power with a smaller power than the first lens power is set as the second lens power set for the second power region 26. In this way, when the base power is a plus diopter, as shown in the graph of k=0.000 of FIG. 5 described previously, the Xw numerical value is indicated as positive, specifically, the center-of-gravity position 9 is shifted to the nose side (the right side in FIG. 14) in relation to the lens geometric center 5.

To correct this center-of-gravity position shift, with this embodiment, the thickness dimensions of the left and right thick parts 34a and 34b are made to be different. Specifically, when the first lens power is made to be a plus diopter, as shown in FIG. 6 described previously, the relative thickness dimension difference ε between the left and right thick parts 34a and 34b is a positive numerical value. Therefore, the thickness dimension Ta' of the other thick part 34a (see FIG. 16) is made to be larger than the thickness dimension Tb' of the one thick part 34b (see FIG. 16) (Tb'<Ta'). By so doing, center-of-gravity deviation is set to the ear side' for the peripheral zone 20 with the contact lens 46 (the left side in FIG. 14), so that the center-of-gravity position shift that accompanies deviation of the optical center in relation to the lens geometric center 16 is corrected by offset. As a result, it is possible to have the lens geometric center 16 and the center-of-gravity position 40 of the contact lens 46 be close to each other.

Figure 17:
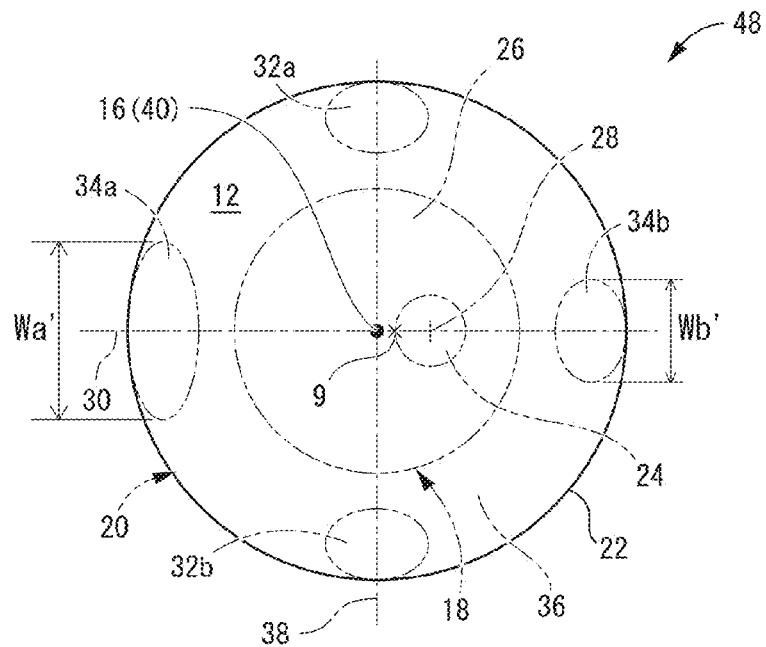
FIG. 17 is a front view showing another design of the contact lens as the second embodiment of the present invention.
Figure 18:
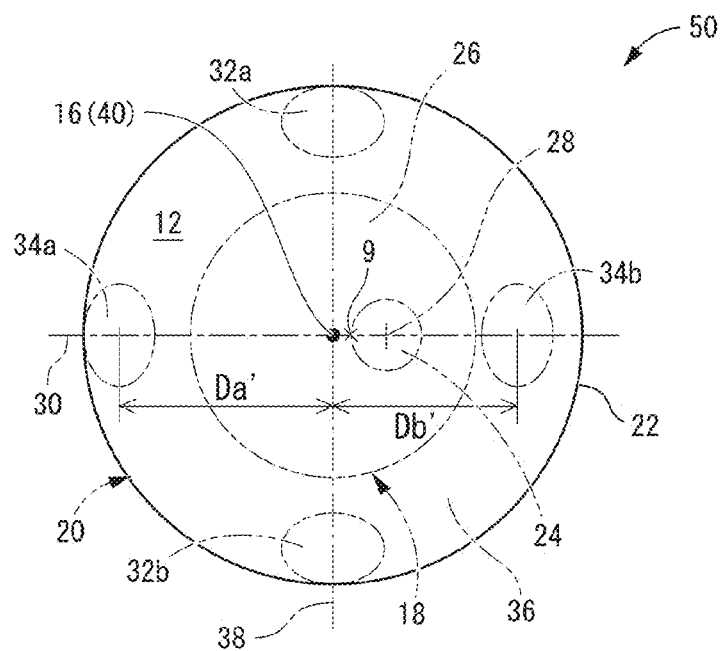
FIG. 18 is a front view showing yet another design of the contact lens as the second embodiment of the present invention.

Furthermore, contact lenses 48 and 50 of other designs of this embodiment are shown in FIGS. 17 and 18. Specifically, with the contact lens 48 shown in FIG. 17, the width dimension Wa' of the other thick part 34a (see FIG. 17) is made to be larger than the width dimension Wb' of the one thick part 34b (see FIG. 17) (Wb'<Wa'). Also, with the contact lens 50 shown in FIG. 18, the distance Da' between the center of the other thick part 34a in the circumferential direction and the radial direction of the contact lens 50 and the lens geometric center 16 is made to be larger than the distance Db' between the center of the one thick part 34b in the circumferential direction and the radial direction of the contact lens 50 and the lens geometric center 16 (see FIG. 18) (Db'<Da'). By so doing, center-of-gravity deviation in relation to the lens geometric center 16 is caused on the peripheral zone 20 with the contact lenses 48 and 50, and the center-of-gravity position shift that accompanies deviation of the optical center of the optical zone 18 from the lens geometric center 16 can be corrected by offset.

Therefore, for the contact lenses 46, 48, and 50 of this embodiment shown in FIGS. 14 to 18 as well, it is possible to exhibit the same effects as for the contact lens 10 of the first embodiment.

Figure 19:
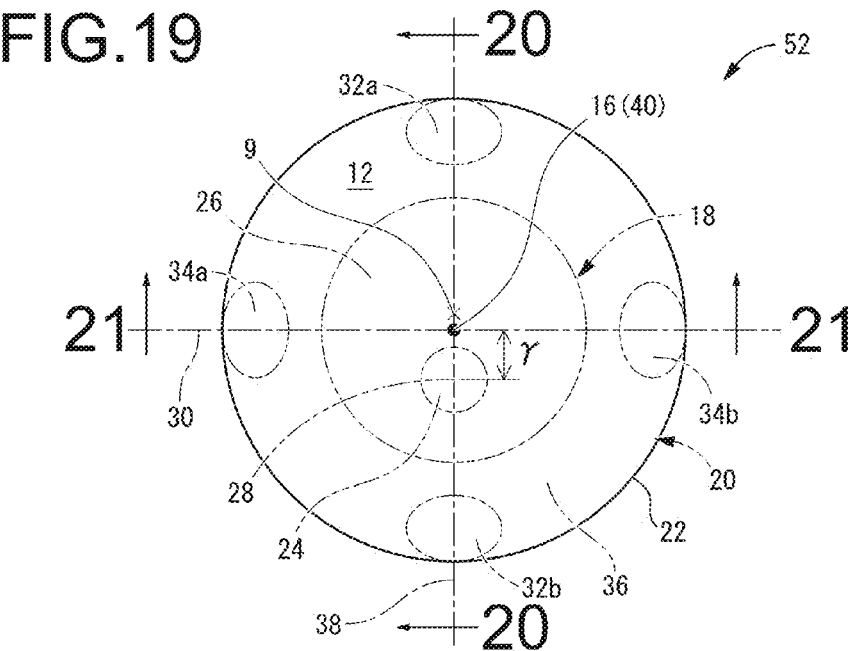
FIG. 19 is a front view showing a contact lens as a third embodiment of the present invention.
Figure 20:
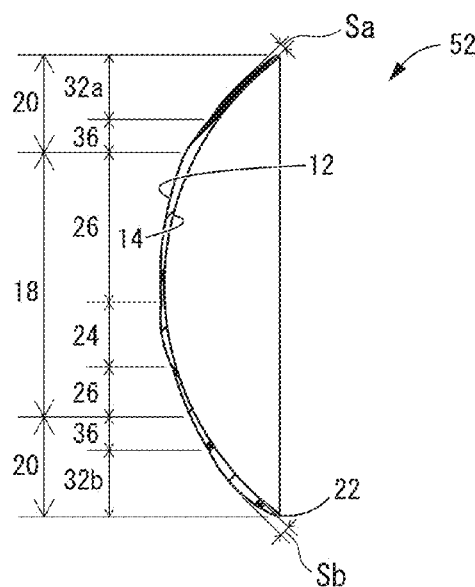
FIG. 20 is a cross section view taken along line 20-20 of FIG. 19.
Figure 21:
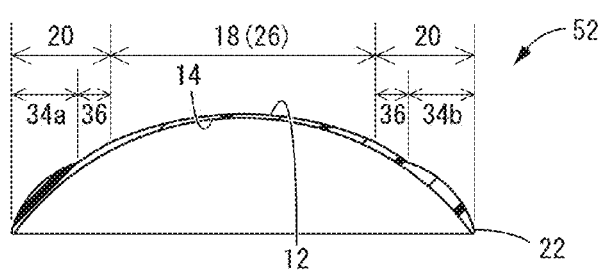
FIG. 21 is a cross section view taken along line 21-21 of FIG. 19.

Next, in FIGS. 19 to 21, a contact lens 52 is shown as a third embodiment of the present invention. With this embodiment, while the first power region 24 is used for near vision, the second power region 26 is used for far vision, and a minus diopter lens power is set for each of the first and second lens powers. The external shape center 28 of the first power region 24 is deviated from the lens geometric center 16 by an amount y (see FIG. 19), and is positioned in the lower part on a vertical diametrical line 38 in the worn state. Preferably, the setting is 0.4 mm≤γ, more preferably 0.5 mm≤γ≤3.0 mm, and most preferably 0.5 mm≤γ≤1.5 mm, and with this embodiment, γ=1.0 mm. This is because when y is less than 0.4 mm, the volume of the center-of-gravity position shift that accompanies deviation of the optical center of the optical zone 18 (2) from the lens geometric center 16 (5) is too small, and there is the risk of failing to obtain sufficient correction effect owing to the center-of-gravity deviation set for the peripheral zone 20.

In this way, by having the first power region 24 with a minus diopter lens power set below the lens geometric center 16, the center-of-gravity position 9 is shifted upward in relation to the lens geometric center 16 (5). Also, center-of-gravity deviation is set for the peripheral zone 20 to correct the center-of-gravity position shift, and with this embodiment, the thickness dimensions of the thin parts 32a and 32b provided at the top and bottom of the peripheral zone 20 are made to be different.

Specifically, when the thickness dimension of the upper thin part 32a is Sa (see FIG. 20) and the thickness dimension of the lower thin part 32b is Sb (see FIG. 20), Sa<Sb. Consequently, center-of-gravity deviation of the peripheral zone 20 is set. As a result, the center-of-gravity position shift that accompanies deviation of the optical center of the optical zone 18 from the lens geometric center 16 (5) is corrected by offset, and the center-of-gravity position 40 and the lens geometric center 16 of the contact lens 52 are made to be close to each other.

Figure 22:
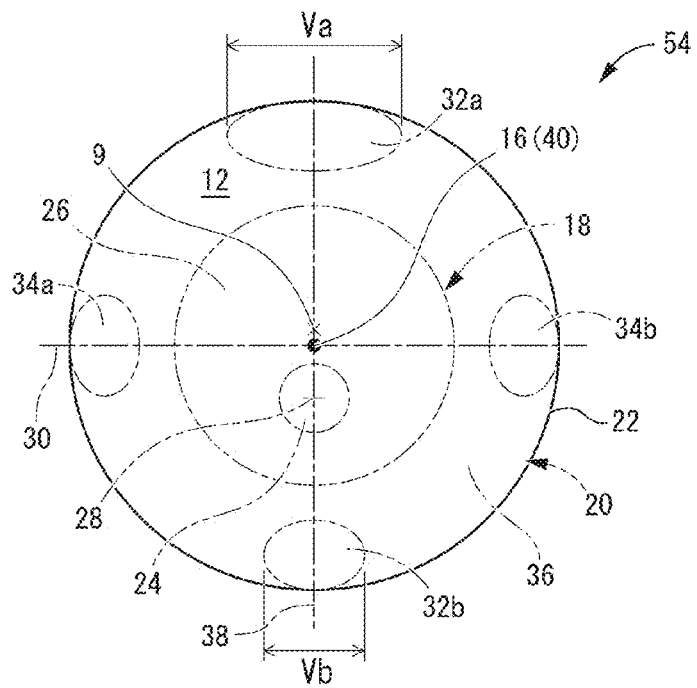
FIG. 22 is a front view showing another design of the contact lens as the third embodiment of the present invention.
Figure 23:
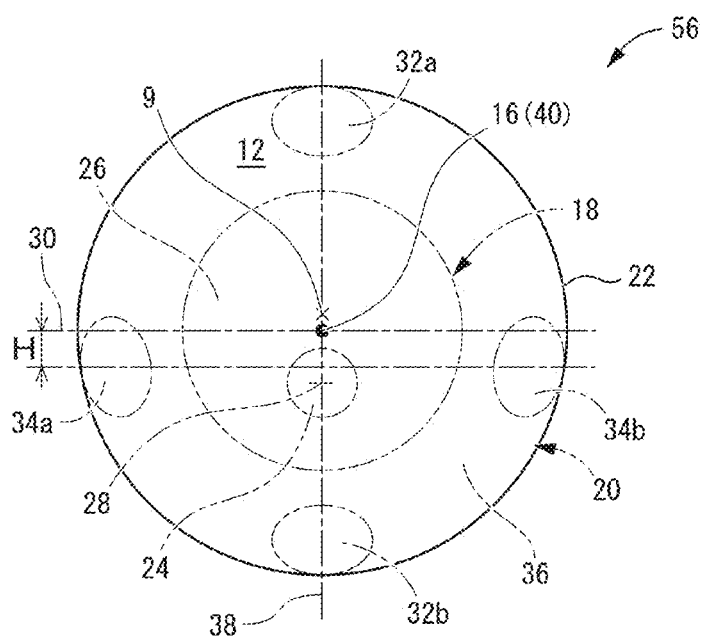
FIG. 23 is a front view showing yet another design of the contact lens as the third embodiment of the present invention.

Furthermore, FIGS. 22 and 23 show contact lenses 54 and 56 as other designs of this embodiment. With the contact lens 54 shown in FIG. 22, the width dimensions of the upper and lower thin parts 32a and 32b provided on the peripheral zone 20 (the dimensions in the lateral direction in FIG. 22) are made to be different. Specifically, width dimension Va of the upper thin part 32a (see FIG. 22) is made to be larger than width dimension Vb of the lower thin part 32b (see FIG. 22) (Vb<Va). Also, with the contact lens 56 shown in FIG. 23, the left and right thick parts 34a and 34b provided on the peripheral zone 20 have asymmetrical shapes in relation to the horizontal diametrical line 30. With this design, the circumferential direction and radial direction centers for the both thick parts 34a and 34b are positioned below the horizontal diametrical line 30 by an amount H (see FIG. 23). By doing these things, center-of-gravity deviation is set for the respective peripheral zones 20 of the contact lenses 54 and 56, the center-of-gravity position shift accompanying deviation of the optical center of the optical zone 18 from the lens geometric center 16 (5) is corrected by offset, and the center-of-gravity position 40 and the lens geometric center 16 in the contact lenses 54 and 56 are respectively made to be close to each other.

Therefore, by using the contact lenses 52, 54 and 56 of this embodiment constituted as described above, even for people for whom it is easy for the contact lens to stabilize downward from the center of the cornea of the eye on which the lens is worn, it is possible to effectively position the pupil center line in relation to the external shape center 28 of the first power region 24, and it is easy for the lens geometric center 16 to be positioned at the center of the cornea, so that it is possible to have the same effect exhibited as that of the contact lens 10 of the first embodiment.

Figure 24:
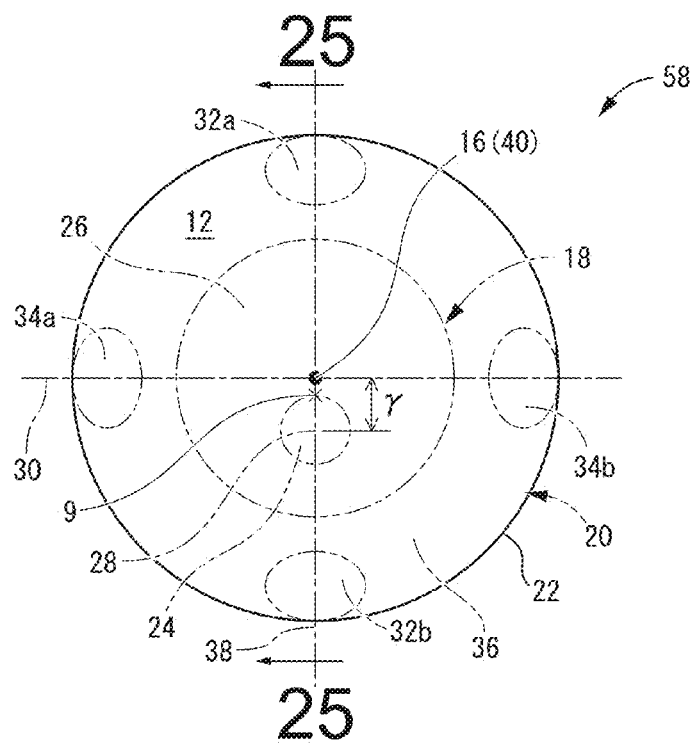
FIG. 24 is a front view showing a contact lens as a fourth embodiment of the present invention.
Figure 25:
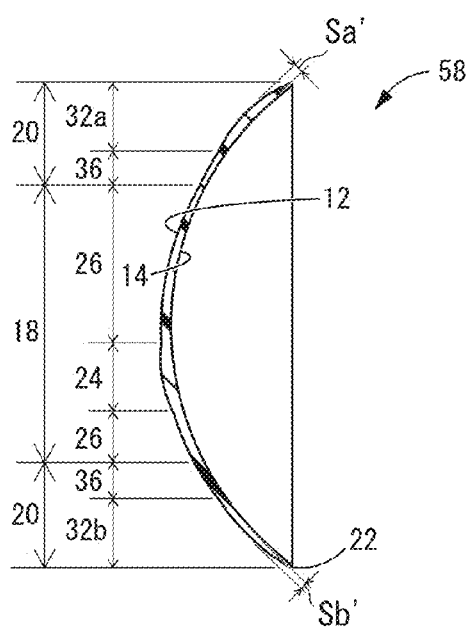
FIG. 25 is a cross section view taken along line 25-25 of FIG. 24.

Next, FIGS. 24 and 25 show a contact lens 58 as a fourth embodiment of the present invention. With this embodiment, while the first power region 24 is used for near vision, the second power region 26 is used for far vision, and plus diopter lens powers are set for the first and second lens powers. Also, the external shape center 28 of the first power region 24 deviates from the lens geometric center 16 by an amount γ, and is positioned in the lower part on the vertical diametrical line 38 in the worn state.

In this way, by setting the first power region 24 having a plus diopter lens power to be below the lens geometric center 16, the center-of-gravity position 9 is shifted to be below the lens geometric center 16 (5). Also, center-of-gravity deviation is set for the peripheral zone 20 to correct the center-of-gravity position shift, and with this embodiment, the thickness dimensions of the thin parts 32a and 32b provided at the top and bottom of the peripheral zone 20 are made to be different.

Specifically, when the thickness dimension of the upper thin part 32a is Sa' (see FIG. 25) and the thickness dimension of the lower thin part 32b is Sb' (see FIG. 25), Sb'<Sa', thereby setting the center-of-gravity deviation of the peripheral zone 20. As a result, the center-of-gravity position shift accompanying deviation of the optical center of the optical zone 18 from the lens geometric center 16 (5) is corrected by offset, and the center-of-gravity position 40 and the lens geometric center 16 of the contact lens 58 are made to be close to each other.

Figure 26:
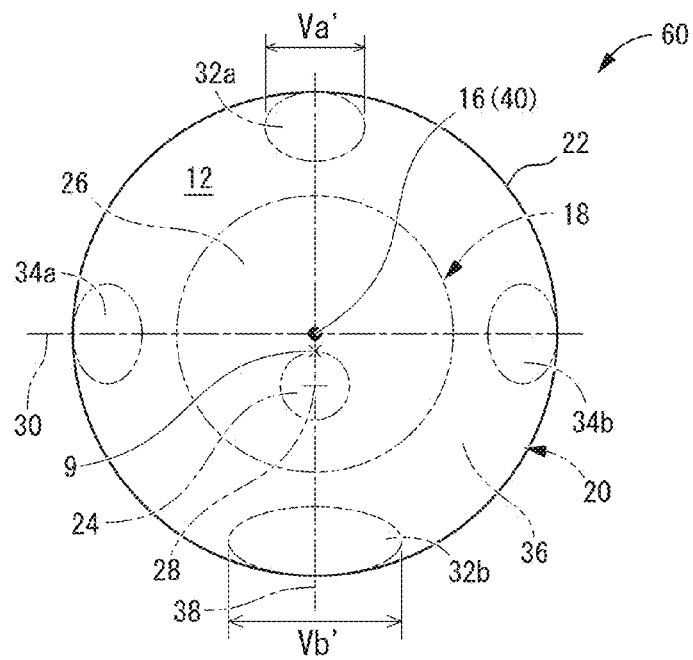
FIG. 26 is a front view showing another design of the contact lens as the fourth embodiment of the present invention.
Figure 27:
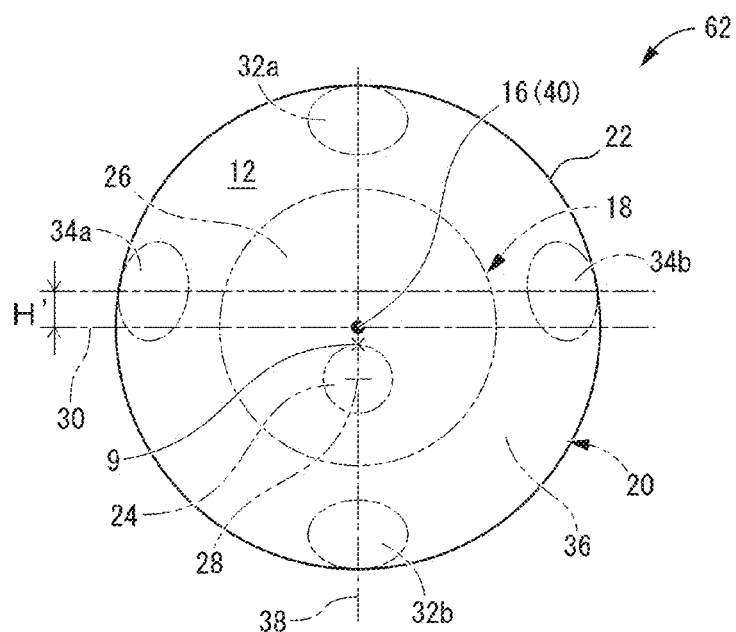
FIG. 27 is a front view showing yet another design of the contact lens as the fourth embodiment of the present invention.

Furthermore, FIGS. 26 and 27 show contact lenses 60 and 62 as other designs of this embodiment. With the contact lens 60 shown in FIG. 26, in the peripheral zone 20, the width dimension Vb' of the lower thin part 32b (see FIG. 26) is made to be larger than the width dimension Va' of the upper thin part 32a (see FIG. 26) (Va'<Vb'). Also, with the contact lens 62 shown in FIG. 27, the circumferential direction and radial direction centers of the left and right thick parts 34a and 34b provided on the peripheral zone 20 are positioned to be above the horizontal diametrical line 30 by an amount H' (see FIG. 27). By so doing, center-of-gravity deviation is set at the respective peripheral zones 20 of the contact lenses 60 and 62, the center-of-gravity position shift accompanying deviation of the optical center of the optical zone 18 from the lens geometric center 16 (5) is corrected by offset, and the center-of-gravity position 40 and the lens geometric center 16 in the contact lenses 60 and 62 are respectively made to be close to each other.

Therefore, with the contact lenses 58, 60, and 62 of this embodiment constituted as described above as well, it is possible to have the same effect exhibited as that of the contact lens 10 of the first embodiment.

Figure 28:
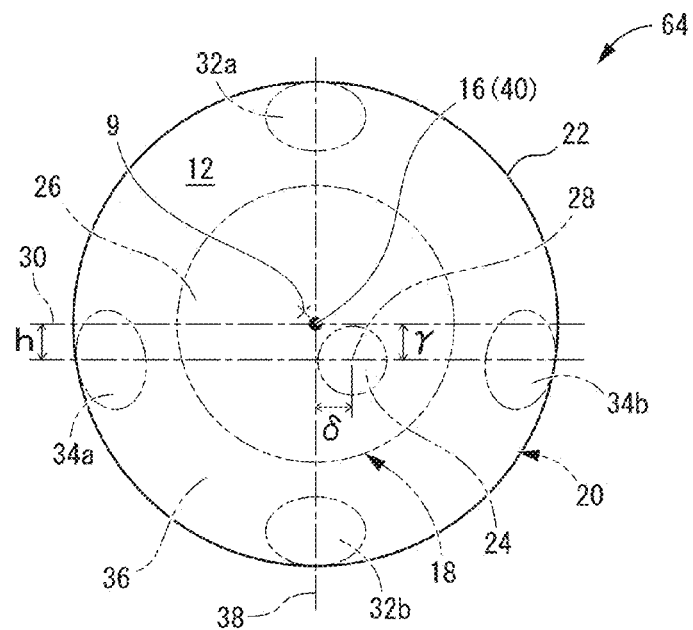
FIG. 28 is a front view showing a contact lens as a fifth embodiment of the present invention.

Next, FIG. 28 shows a contact lens 64 as a fifth embodiment of the present invention. With this embodiment, the first power region 24 is used for near vision, while the second power region 26 is used for far vision, and minus diopter lens powers are set as the first and second lens powers. Also, the external shape center 28 of the first power region 24 deviates by δ to the nose side and by γ downward from the lens geometric center 16. In this way, by setting the first power region 24 having a minus diopter lens power to the nose side downward in relation to the lens geometric center 16, the center-of-gravity position 9 is shifted to the ear side upward in relation to the lens geometric center 16 (5). Also, center-of-gravity deviation is set for the peripheral zone 20 to correct the center-of-gravity position shift.

Specifically, with this embodiment, to correct the center-of-gravity position shift in the horizontal direction using offset, the thickness dimensions ta and tb (not illustrated) of the left and right thick parts 34a and 34b provided on the peripheral zone 20 are made to be different, with the thickness dimension tb of the one thick part 34b being made greater than the thickness dimension ta of the other thick part 34a. Also, to correct the center-of-gravity position shift in the vertical direction using offset, the circumferential direction and radial direction centers with the left and right thick parts 34a and 34b are positioned below the horizontal diametrical line 30 by an amount h (see FIG. 28).

By so doing, center-of-gravity deviation in relation to the lens geometric center 16 is set for the peripheral zone 20, and the center-of-gravity position shift accompanying deviation of the optical center of the optical zone 18 in relation to the lens geometric center 16 is corrected by offset. As a result, the center-of-gravity position 40 of the contact lens 64 is made to be close to the lens geometric center 16, and it is possible to have the same effect exhibited as for the contact lens 10 of the first embodiment.

EXAMPLE

As Example, trial production was done with a contact lens constituted according to the present invention, and by comparing this to a contact lens constituted according to the prior art, it was confirmed whether, compared to the contact lens according to the prior art, the contact lens according to the constitution of the present invention had the center-of-gravity position closer to the lens geometric center, and whether when worn, the lens of this invention was worn stabilized at the intended circumferential direction position. As a test lens according to the constitution of the present invention, the contact lens of the structure shown in FIG. 1 was used. On the other hand, as the control lens according to the prior art structure, the contact lens of the structure shown in FIG. 31 was used. As the materials of the respective lenses, asmofilcon A was used, and a base curve (B.C.) of 8.60 mm, lens diameter (DIA.) of 14.2 mm, and distance δ from the lens geometric center to the external shape center of the first power region of 1.0 mm were designed. Furthermore, these contact lenses were bifocal lenses, and in addition to the second lens power which is the respective base power being −5.00 (D), +2.00 (D) was set as the additional power.

Also, when the control lens was produced virtually on a computer, and the center-of-gravity position was calculated using SolidWorks made by Dassault Systémes SOLIDWORKS Corp., the center-of-gravity position was shifted to the ear side in relation to the lens geometric center, the distance Xw from the lens geometric center to the center-of-gravity position was 0.18 (mm), and the shift rate Rw was about 1.3%. The left and right thick parts for this control lens have the same shape, so the relative thickness dimension difference ε between the left and right thick parts is 0.000 (mm).

The test lens for which the thickness dimension of the nose side thick part of the control lens of this shape was made larger was produced virtually on the computer, and the center-of-gravity position thereof was calculated. As the coefficient k when setting the relative thickness dimension difference E between the both thick parts, k=0.003 was used, and the thickness dimension of the nose side thick part was made to be larger by an amount 0.015 (mm) compared to the thickness dimension of the ear side thick part. As a result, the center-of-gravity position of the test lens was shifted to the ear side in relation to the lens geometric center, and the distance Xw from the lens geometric center to the center-of-gravity position was 0.11 (mm), and the shift rate Rw was about 0.8%.

It could be confirmed, from the above, in the test lens, compared to the control lens, it was possible to have the shift rate of the center-of-gravity position from the lens geometric center be smaller, and that the center-of-gravity position came closer to the lens geometric center by an amount of 0.07 (mm).

Also, the test lens and control lens were worn on the human eye, and it was confirmed how they stabilized at the intended circumferential direction position. As the measuring method, the same lens of the test lens or control lens was individually worn on both eyes of the subject, and after 15 minutes of wearing, the circumferential direction position of each lens was measured using a slit lamp microscope. When doing this measurement, a guide mark was added extending in the vertical direction at the bottom of each lens, the incline of this guide mark was measured five times every 30 seconds, and the average value of these was calculated as the stabilized circumferential direction position. For this guide mark incline, with the vertical direction downward as 0°, an incline in the clockwise direction, specifically, to the ear side, is indicated with plus, and an incline in the counter-clockwise direction, specifically, to the nose side, is indicated with minus. The measurement was implemented on eight eyes of four persons. The results are shown in Table 1.

TABLE 1

| Subject | Worn Eye Side (R/L) | Control Lens | Test Lens |
|---|---|---|---|
| 1 | R | −9° | −5° |
|   | L | −5° | −4° |
| 2 | R | −19° | −15° |
|   | L | +2° | −3° |
| 3 | R | −12° | −3° |
|   | L | +5° | 0° |
| 4 | R | −16° | −14° |
|   | L | −6° | −2° |

In Table 1 noted above, the measured value of the test lens for which the incline of the guide mark is closer to 0° in comparison to the incline of the guide mark of the corresponding control lens is each indicated by bold characters. Specifically, for at least six eyes of the eight eyes on which testing was implemented, it was possible to confirm the effect of the present invention.

Figure 29:
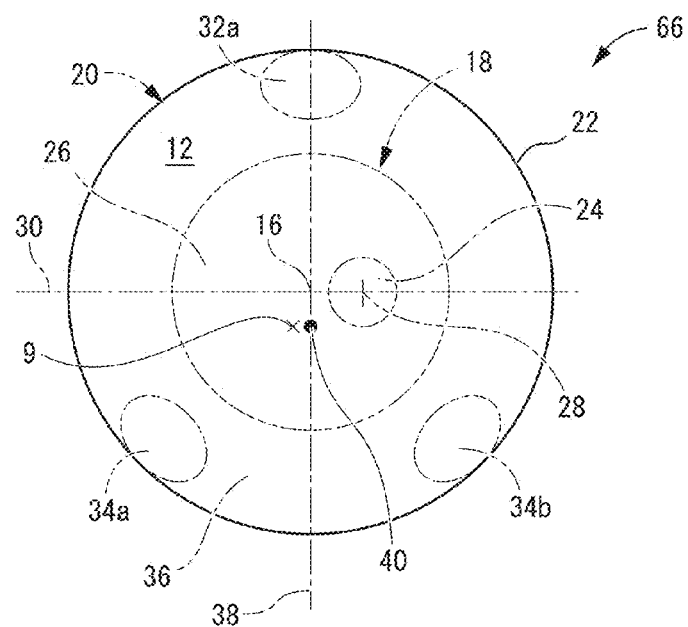
FIG. 29 is a front view showing another design of the contact lens of the present invention.

Above, we gave detailed descriptions about the embodiments of the present invention, but the present invention is not limited by those specific descriptions. For example, with the embodiments noted above, a double slab-off structure is used as the circumferential direction alignment mechanism that sets the circumferential direction position of the contact lens, but for example, it is also possible to use a periballast structure as shown in FIG. 29. Specifically, it is also possible to provide the thin part 32a at the top part of a contact lens 66, and the left and right thick parts 34a and 34b can be provided lower than the horizontal diametrical line 30. Also, for example, of the thick parts 34a and 34b, one thick part (in FIG. 29, the nose side thick part 34b) has the relative thickness dimension made larger than that of the other thick part. Consequently, center-of-gravity deviation is caused at the peripheral zone 20, and it is possible to correct using offset the center-of-gravity position shift accompanying deviation of the optical center of the optical zone 18 from the lens geometric center 16. The first lens power of the contact lens 66 shown in FIG. 29 is set to be a minus diopter. Also, though it is omitted from the drawing, with the contact lens 66, the area between the lower thick parts 34a and 34b in the circumferential direction is made to be a relatively thin walled region.

As this circumferential direction alignment mechanism, in addition to the double slab-off structure and periballast structure, for example, it is also possible to use a prism ballast structure by which the lens front and back surfaces 12 and 14 are shifted downward along the region including the optical zone 18 and the peripheral zone 20 to make the bottom thicker, a truncation structure for which at least one end edge part in the lens vertical direction is cut in roughly the chord direction, and a structure for which these shapes are combined. As the circumferential direction alignment mechanism, for example when using structures for which the center-of-gravity position is deviated intentionally, such as the periballast structure, the prism ballast structure or the like, it is preferable to correct the center-of-gravity position so as to maintain that center-of-gravity deviation effect.

Also, with the embodiments noted above, as the optical characteristics of the optical zone 18, a bifocal lens having two focal points is used. But for example it is also possible to use a lens such as a progressive or multifocal lens for which the lens power changes smoothly or gradually or in steps in the radial direction. The optical characteristics that can be used for the optical zone is not limited to optical characteristics for correcting far and near such as this. It is also possible to use optical characteristics for correcting astigmatism, optical characteristics for correcting irregular astigmatism having coma-like aberration power distribution, optical characteristics for which aberration is controlled using an aspherical expression or Zernike polynomial expression, optical characteristics that inhibit myopia progression, or various characteristics that combine these characteristics. Naturally, it is also possible to use a monofocal lens having a single focal point, but when the optical characteristics as described above are set for the optical zone, it is easier to cause center-of-gravity deviation compared to with a simple monofocal lens, so that the correction effect of the center-of-gravity position shift can be enjoyed at a higher level of advantage.

Furthermore, with the embodiments noted above, a roughly constant lens power is used for the first and second lens powers, but these lens powers can also change in the radial direction. Also, for example at the boundary part between the first power region and the second power region, it is possible to provide a middle region which is set with an intermediate lens power between the first lens power and the second lens power, and it is also possible to have the lens power change gradually or in steps across the entire optical zone.

Yet further, with the first and second embodiments noted above, thickness dimension is increased in one of the pair of thick parts 34a and 34b, the width dimension is made larger therein, or the radial direction distance from the lens geometric center 16 is made larger to cause center-of-gravity deviation on the peripheral zone 20. However, since it is sufficient to have the shapes of both thick parts 34a and 34b be made to be different from each other, it is also possible to make the thickness dimension or width dimension of the other thick part smaller, and to make the radial direction distance from the lens geometric center 16 therefor smaller or the like. Moreover, it is also possible to apportion, between the left and right thick parts 34a and 34b, the thickness dimension difference, the width dimension difference, or the radial direction distance difference from the lens geometric center 16. The same is also true for the third and fourth embodiments noted above, and rather than just one of the pair of thin parts 32a and 32b, it is also possible to set the thickness dimension difference, the width dimension difference or the like to the other or to both.

Furthermore, for example it is also possible to constitute a contact lens set by combining a plurality of types of the contact lenses of the present invention as described above. This contact lens set is constituted by assorting a plurality of types of contact lenses with different base powers as the standard values for the lens power for correction set for the optical zone 18. Also, with each contact lens constituting this contact lens set, since the power set for the optical zone 18 (particularly second power region 26) and the size of the center-of-gravity position shift are roughly corresponding, it is possible to have a correspondence between the power set for the optical zone 18 and the size of the center-of-gravity deviation needed to correct the center-of-gravity position shift, which is set for the peripheral zone 20. In this way, by having the set power (power) and the size of the center-of-gravity deviation correspond to each other, it is possible to avoid having an excessively large number of combinations of the optical zone 18 and the peripheral zone 20, specifically, the number of types of contact lenses constituting the contact lens set, thereby enabling efficient management and the like.

For the contact lenses 10, 42, 44, 46, 48, 50, 52, 54, 56, 58, 60, 62, 64, and 66 noted in the embodiments above, it is preferable to provide a guide mark or the like to distinguish between the left and right sides or top and bottom sides of the lens. This guide mark can be formed using printing or the like at the nose side downward or ear side downward of the lens or the like, and various shapes such as a straight line shape or dot shape or the like can be used.

Also, when correcting center-of-gravity position shift according to the present invention, it is not absolutely necessary to set the center-of-gravity position shift by the setting of decentering to zero, and by performing correction with which the lens center-of-gravity position is close to the lens geometric center, it is possible to have the effect of the present invention exhibited as described previously.

Furthermore, with the embodiments noted above, the optical center of the optical zone 18 is deviated in the lateral direction (to the right in the drawings) or in the vertical direction downward in relation to the lens geometric center 16. However, it was easy for the contact lens to stabilize below the pupil center due to the action of gravity and the like, so that with the goal of having the pupil center and optical center be close to each other, it is also possible to use a decentered type contact lens with which the optical center is deviated in the vertical direction upward in relation to the lens geometric center 16. With this contact lens as well, center-of-gravity position shift is caused accompanying the deviation of the optical center in relation to the lens geometric center 16. Therefore, by correcting the center-of-gravity position by offset using the center-of-gravity deviation of the peripheral zone 20, it is possible to have the center-of-gravity position 40 be close to the lens geometric center 16, and possible to have it be close to the initial setting position when the contact lens is worn.

Figure 30:
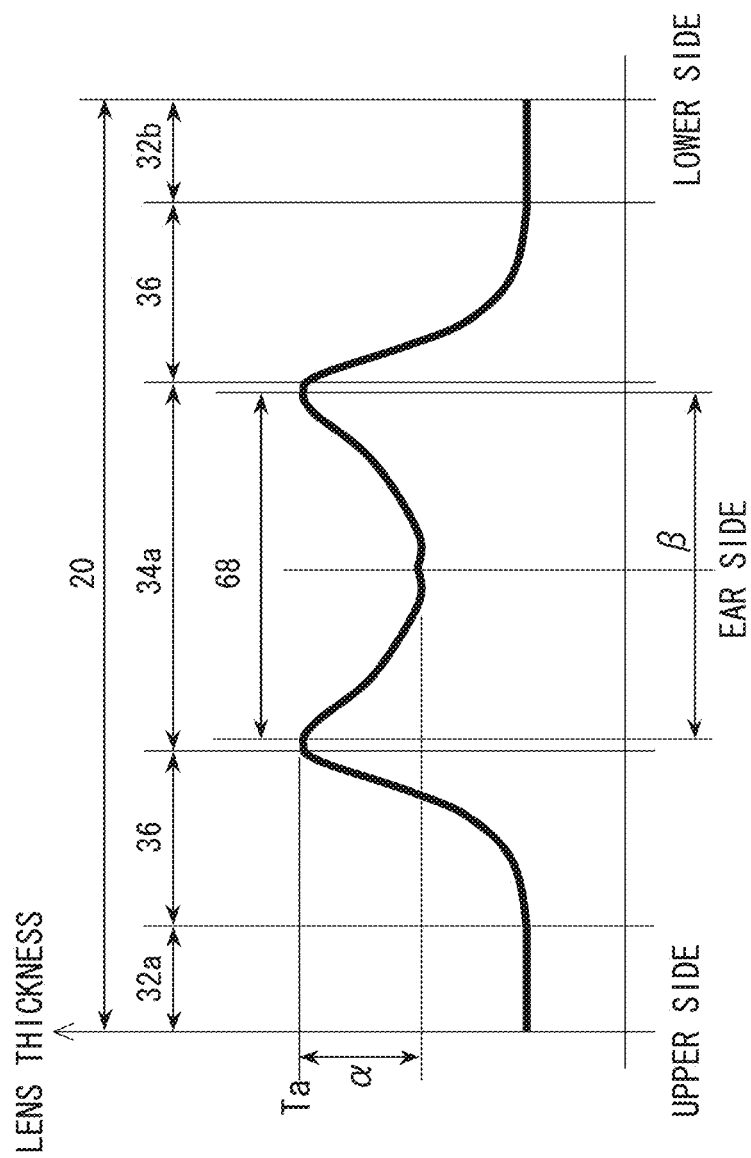
FIG. 30 is a view suitable for explaining yet another design of the contact lens of the present invention, which shows changes in thickness of the semicircle of a lens front surface.

Also, as shown in FIG. 30, it is also possible to provide a recess part 68 on at least one of the thick parts 34a and 34b with the embodiments noted above. By providing this kind of recess part 68, it is possible to set center-of-gravity deviation in relation to the lens geometric center 16 with the peripheral zone 20, and thus possible to use offset to correct the center-of-gravity position shift accompanying deviation of the optical center of the optical zone 18. FIG. 30 shows changes in the thickness dimension of the lens front surface 12 at a part with a suitable radial direction distance from the lens geometric center 16 of the semicircle positioned at the left side of the contact lens 10 shown in FIG. 1, for example. Specifically, the left edge is the top side, and the right edge is the bottom side, and the recess part 68 is provided at the ear side thick part 34a. On the other hand, it is also possible to not provide the recess part 68 on the nose side thick part 34b, to have the depth dimension a of the recess part 68 be smaller, or to have the circumferential direction dimension β be smaller.

Yet further, with this embodiment, the center-of-gravity deviation of the peripheral zone 20 was set using the circumferential direction alignment mechanism for setting the lens circumferential direction position in the worn state, but the setting means for the center-of-gravity deviation for the peripheral zone 20 can also be provided as a separate feature from the circumferential direction alignment mechanism.

KEYS TO SYMBOLS 10, 42, 44, 46, 48, 50, 52, 54, 56, 58, 60, 62, 64, 66: contact lens (decentered type contact lens); 12: lens front surface; 14: lens back surface; 16: lens geometric center; 18: optical zone; 20: peripheral zone; 32a, 32b: thin part; 34a, 34b: thick part; 40: center-of-gravity position

The invention claimed is:

1. A decentered type contact lens comprising:
   an optical zone provided in a center part of the contact lens;
   a peripheral zone provided on an outer circumference of the optical zone;
   an optical center of the optical zone positioned on a horizontal diametrical line that passes through a lens geometric center of the contact lens, the optical center of the optical zone being set to deviate to a nose side from the lens geometric center; and
   a circumferential direction alignment mechanism configured to set a lens circumferential direction position in a worn state, the circumferential direction alignment mechanism including at least two thick portions of the contact lens, which are located on opposite sides of the lens geometric center along the horizontal diametrical line in the peripheral zone, each of the at least two thick portions of the contact lens having a different thickness from each other in a thickness direction of the contact lens, the thickness of each of the at least two thick portions of the contact lens being greater than a thickness of remaining portions of the contact lens, wherein:
a center-of-gravity deviation in relation to the lens geometric center is set by the peripheral zone, and
when the optical zone has minus diopter correction optical characteristics and the optical center of the optical zone deviates on the diametrical line to the nose side from the lens geometric center, the center-of-gravity deviation of the peripheral zone is set in relation to the lens geometric center so that a lens center-of-gravity position deviates to a same side as an optical center deviation direction and deviates along the horizontal diametrical line.

2. The decentered type contact lens according to claim 1, wherein the center-of-gravity deviation of the peripheral zone is set by changing a radial direction cross section shape of the peripheral zone in a circumferential direction such that both side parts opposite in a diametrical direction in which the center-of-gravity deviation is set are made mutually different in terms of at least one of a peripheral zone thickness dimension, width dimension, and diametrical direction center-of-gravity position.

3. The decentered type contact lens according to claim 1, wherein the optical zone has at least one of optical characteristics for correcting far and near, optical characteristics for correcting astigmatism, optical characteristics for correcting aberration, and optical characteristics for inhibiting myopia progression with an eye optical system.

4. The decentered type contact lens according to claim 1, wherein the center-of-gravity deviation with the peripheral zone is set by a shape of a lens front surface.

5. The decentered type contact lens according to claim 1, wherein the circumferential direction alignment mechanism is constituted by at least one of:
a double slab-off having on the peripheral zone a pair of thin portions positioned in a vertical direction of the contact lens in the worn state, and the pair of thick portions positioned in a lateral direction of the contact lens in the worn state,
a periballast for which the pair of thick portions with the double slab-off are deviated respectively downward,
a prism ballast by which lens front and back surfaces are shifted along a region including the optical zone and the peripheral zone making a bottom thicker, and
a truncation of a shape for which at least one of a top or bottom end edge part of the lens is cut in roughly a chord direction.

6. The decentered type contact lens according to claim 1, wherein:
the circumferential direction alignment mechanism is constituted by, providing on the peripheral zone, a pair of thin portions positioned in a vertical direction of the contact lens in the worn state and the pair of thick portions positioned in a lateral direction of the contact lens in the worn state; and
the center-of-gravity deviation in relation to the lens geometric center is set by having relatively different shapes for at least one of between the pair of thick portions and between the pair of thin portions.

7. The decentered type contact lens according to claim 1, wherein a deviation distance of the optical center of the optical zone from the lens geometric center is 0.4 mm or greater.

8. The decentered type contact lens according to claim 1, wherein a shift rate of the lens center-of-gravity position in relation to the lens geometric center is set to be 2% or less, the shift rate, Rw, being defined by: $Rw=((Xw/DIA.)\times 100)$ (%), where Xw is a distance between the lens geometric center and the lens center-of-gravity position, and DIA. is a lens outer diameter dimension.

9. The decentered type contact lens according to claim 1, wherein:
the pair of thick portions are positioned in a lateral direction of the contact lens in the worn state on the peripheral zone, and
the center-of-gravity deviation is set by having different thickness dimensions between the pair of thick portions, and by setting a thickness dimension difference between the pair of thick portions to be within a range of 0.01 to 0.1 mm.

10. A decentered type contact lens set comprising:
a plurality of contact lenses according to claim 1, each of the plurality of contact lenses having a different base power as a lens power specific value for correction applied to the optical zone thereof, wherein
with the plurality of contact lenses, respective sizes of the center-of-gravity deviation set for the peripheral zone vary in correspondence with the respective lens power specific values for correction set for the optical zone.

11. A decentered type contact lens comprising:
an optical zone provided in a center part of the contact lens;
a peripheral zone provided on an outer circumference of the optical zone;
an optical center of the optical zone positioned on a horizontal diametrical line that passes through a lens geometric center of the contact lens, the optical center of the optical zone being set to deviate to a nose side from the lens geometric center; and
a circumferential direction alignment mechanism configured to set a lens circumferential direction position in a worn state, the circumferential direction alignment mechanism including at least two thick portions of the contact lens, which are located on opposite sides of the lens geometric center along the horizontal diametrical line in the peripheral zone, each of the at least two thick portions of the contact lens having a different thickness from each other in a thickness direction of the contact lens, the thickness of each of the at least two thick portions of the contact lens being greater than a thickness of remaining portions of the contact lens, wherein:
a center-of-gravity deviation in relation to the lens geometric center is set by the peripheral zone, and
when the optical zone has plus diopter correction optical characteristics and the optical center of the optical zone deviates on the diametrical line to the nose side from the lens geometric center, the center-of-gravity deviation of the peripheral zone is set in relation to the lens geometric center so that a lens center-of-gravity position deviates to a side opposite of an optical center deviation direction and deviates along the horizontal diametrical line.

12. The decentered type contact lens according to claim 11, wherein the center-of-gravity deviation of the peripheral zone is set by changing a radial direction cross section shape of the peripheral zone in a circumferential direction such that both side parts opposite in a diametrical direction in which the center-of-gravity deviation is set are made mutually different in terms of at least one of a peripheral zone thickness dimension, width dimension, and diametrical direction center-of-gravity position.

13. The decentered type contact lens according to claim 11, wherein the optical zone has at least one of optical characteristics for correcting far and near, optical characteristics for correcting astigmatism, optical characteristics for correcting aberration, and optical characteristics for inhibiting myopia progression with an eye optical system.

14. The decentered type contact lens according to claim 11, wherein the center-of-gravity deviation with the peripheral zone is set by a shape of a lens front surface.

15. The decentered type contact lens according to claim 11, wherein the circumferential direction alignment mechanism is constituted by at least one of:
- a double slab-off having on the peripheral zone a pair of thin portions positioned in a vertical direction of the contact lens in the worn state, and the pair of thick portions positioned in a lateral direction of the contact lens in the worn state,
- a periballast for which the pair of thick portions with the double slab-off are deviated respectively downward,
- a prism ballast by which lens front and back surfaces are shifted along a region including the optical zone and the peripheral zone making a bottom thicker, and
- a truncation of a shape for which at least one of a top or bottom end edge part of the lens is cut in roughly a chord direction.

16. The decentered type contact lens according to claim 11, wherein:
- the circumferential direction alignment mechanism is constituted by, providing on the peripheral zone, a pair of thin portions positioned in a vertical direction of the contact lens in the worn state and the pair of thick portions positioned in a lateral direction of the contact lens in the worn state; and
- the center-of-gravity deviation in relation to the lens geometric center is set by having relatively different shapes for at least one of between the pair of thick portions and between the pair of thin portions.

17. The decentered type contact lens according to claim 11, wherein a deviation distance of the optical center of the optical zone from the lens geometric center is 0.4 mm or greater.

18. The decentered type contact lens according to claim 11, wherein a shift rate of the lens center-of-gravity position in relation to the lens geometric center is set to be 2% or less, the shift rate, Rw, being defined by: $Rw=((Xw/DIA.)\times 100)$ (%), where Xw is a distance between the lens geometric center and the lens center-of-gravity position, and DIA. is a lens outer diameter dimension.

19. The decentered type contact lens according to claim 11, wherein:
- the pair of thick portions are positioned in a lateral direction of the contact lens in the worn state on the peripheral zone, and
- the center-of-gravity deviation is set by having different thickness dimensions between the pair of thick portions and by setting a thickness dimension difference between the pair of thick portions to be within a range of 0.01 to 0.1 mm.

20. A decentered type contact lens set comprising:
- a plurality of contact lenses according to claim 11, each of the plurality of contact lenses having a different base power as a lens power specific value for correction applied to the optical zone thereof, wherein
- with the plurality of contact lenses, respective sizes of the center-of-gravity deviation set for the peripheral zone vary in correspondence with the respective lens power specific values for correction set for the optical zone.

* * * * *